United States Patent
Ito et al.

(10) Patent No.: US 10,957,489 B2
(45) Date of Patent: Mar. 23, 2021

(54) MEDIUM AND METHOD OF MANUFACTURING ELECTRONIC COMPONENT

(71) Applicant: Murata Manufacturing Co., Ltd., Nagaokakyo (JP)

(72) Inventors: Shuichi Ito, Nagaokakyo (JP); Hirokazu Yamaoka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 237 days.

(21) Appl. No.: 15/715,225

(22) Filed: Sep. 26, 2017

(65) Prior Publication Data
US 2018/0090276 A1 Mar. 29, 2018

(30) Foreign Application Priority Data

Sep. 28, 2016 (JP) .............................. JP2016-189409
Sep. 28, 2016 (JP) .............................. JP2016-189410
Mar. 24, 2017 (JP) .............................. JP2017-059151

(51) Int. Cl.
| | |
|---|---|
| *H01G 4/30* | (2006.01) |
| *H01G 4/232* | (2006.01) |
| *H01G 4/008* | (2006.01) |
| *H01G 4/248* | (2006.01) |
| *B24B 31/06* | (2006.01) |

(52) U.S. Cl.
CPC ............. *H01G 4/30* (2013.01); *B24B 31/062* (2013.01); *H01G 4/0085* (2013.01); *H01G 4/232* (2013.01); *H01G 4/248* (2013.01)

(58) Field of Classification Search
CPC ... B24B 31/062; B24B 31/067; B24B 31/073; H01G 4/40; H01G 4/0085; H01G 4/232; H01G 4/248

USPC .......................................................... 51/309
See application file for complete search history.

(56) References Cited

U.S. PATENT DOCUMENTS

| | | | |
|---|---|---|---|
| 2009/0169888 A1 | 7/2009 | Kikuhara et al. | |
| 2012/0252322 A1* | 10/2012 | Ishigami | ................ B22F 3/225 451/32 |
| 2016/0176008 A1 | 6/2016 | Maeda et al. | |

FOREIGN PATENT DOCUMENTS

| | | |
|---|---|---|
| CN | 101316672 A | 12/2008 |
| CN | 105451939 A | 3/2016 |
| JP | 05-208360 A | 8/1993 |
| JP | 05208360 A * | 8/1993 |
| JP | 08-078279 A | 3/1996 |

(Continued)

OTHER PUBLICATIONS

The Engineering Toolbox, "Density, Specific Weight and Specific Gravity", Apr. 30, 2020, https://www.engineeringtoolbox.com/density-specific-weight-gravity-d_290.html on Apr. 30, 2020 (Year: 2020).*

(Continued)

*Primary Examiner* — Livius R. Cazan
(74) *Attorney, Agent, or Firm* — Keating & Bennett, LLP

(57) ABSTRACT

A medium is accommodated in a container together with an electronic component body including an underlying electrode layer. The medium treats a surface of the underlying electrode layer while vibration is applied to the container. The medium is spherical or substantially spherical. The medium has a diameter not smaller than about 0.2 mm and not greater than about 2.0 mm. The medium contains tungsten.

11 Claims, 24 Drawing Sheets

(56) References Cited

FOREIGN PATENT DOCUMENTS

| JP | 08078279 A | * | 3/1996 |
|---|---|---|---|
| JP | 2002-219644 A | | 8/2002 |
| JP | 2007-223026 A | | 9/2007 |
| JP | 2008-227314 A | | 9/2008 |
| JP | 2011-171341 A | | 9/2011 |
| JP | 4916450 B2 | | 4/2012 |
| JP | 2012-134286 A | | 7/2012 |
| JP | 2012-206220 A | | 10/2012 |
| WO | 2015/019661 A1 | | 2/2015 |

OTHER PUBLICATIONS

General Kinematics, "VIBRA-CLEAN Vibratory Media Drum", Jan. 14, 2015, https://web.archive.org/web/20150114164210/https://www.generalkinematics.com/foundry-equipment/vibratory-media-drums/ (Year: 2015).*

General Kinematics, "3 Ways GK Has Changed Aggregates Processing", Aug. 19, 2016, https://www.generalkinematics.com/blog/3- ways-gk-changed-aggregates-processing/ (Year: 2016).*

Official Communication issued in corresponding Korean Patent Application No. 10-2017-0114263, dated Jun. 18, 2018.

Official Communication issued in corresponding Japanese Patent Application No. 2016-189409, dated Mar. 31, 2020.

* cited by examiner

FIG. 15

| | TOTAL VOLUME OF CHIP | TOTAL VOLUME OF MEDIUM | PROCESS TIME PERIOD | FREQUENCY | CRACK IN CORNER | SURFACE REFORMATION EFFECT |
|---|---|---|---|---|---|---|
| COMPARATIVE EXAMPLE 1 | $0.5 \times 10^9 mm^3$ | $1.0 \times 10^9 mm^3$ | 7h | 15Hz | 0 | FAILURE |
| COMPARATIVE EXAMPLE 2 | $0.5 \times 10^9 mm^3$ | $1.0 \times 10^9 mm^3$ | 7h | 35Hz | 0 | FAILURE |
| COMPARATIVE EXAMPLE 3 | $0.6 \times 10^9 mm^3$ | $1.0 \times 10^9 mm^3$ | 3h | 23Hz (NATURAL FREQUENCY) | 4/100 | FAILURE |
| COMPARATIVE EXAMPLE 4 | $0.6 \times 10^9 mm^3$ | $1.0 \times 10^9 mm^3$ | 5h | 23Hz (NATURAL FREQUENCY) | 6/100 | FAILURE |
| COMPARATIVE EXAMPLE 5 | $0.8 \times 10^9 mm^3$ | $1.0 \times 10^9 mm^3$ | 5h | 23Hz (NATURAL FREQUENCY) | 35/100 | FAILURE |
| COMPARATIVE EXAMPLE 6 | $1.0 \times 10^9 mm^3$ | $1.0 \times 10^9 mm^3$ | 5h | 23Hz (NATURAL FREQUENCY) | 41/100 | FAILURE |
| COMPARATIVE EXAMPLE 7 | $1.0 \times 10^9 mm^3$ | $1.0 \times 10^9 mm^3$ | 7h | 23Hz (NATURAL FREQUENCY) | 58/100 | FAILURE |
| EXAMPLE 2 | $0.3 \times 10^9 mm^3$ | $1.0 \times 10^9 mm^3$ | 5h | 23Hz (NATURAL FREQUENCY) | 0 | GOOD |
| EXAMPLE 1 | $0.5 \times 10^9 mm^3$ | $1.0 \times 10^9 mm^3$ | 5h | 23Hz (NATURAL FREQUENCY) | 0 | SATISFACTORY |

FIG.23

|  | DIAMETER OF MEDIUM | | | | | |
|---|---|---|---|---|---|---|
|  | 0.1mm | 0.2mm | 0.4mm | 1mm | 2mm | 2.5mm |
| SPECIFIC GRAVITY 5 | 503nm | 167nm | 90nm | 79nm | 150nm | 200nm |
| SPECIFIC GRAVITY 18 | 501nm | 113nm | 82nm | 65nm | 100nm | 180nm |

FIG.24

|  | SURFACE ROUGHNESS Sa OF MEDIUM |
|---|---|
| 1 | 66nm |
| 2 | 34nm |
| 3 | 40nm |
| 4 | 58nm |
| 5 | 1nm |
| AVERAGE | 40nm |
| σ | 25nm |

MEDIUM AND METHOD OF MANUFACTURING ELECTRONIC COMPONENT

CROSS REFERENCE TO RELATED APPLICATIONS

This application claims the benefit of priority to Japanese Patent Application No. 2016-189409 filed on Sep. 28, 2016, Japanese Patent Application No. 2016-189410 filed on Sep. 28, 2016 and Japanese Patent Application No. 2017-059151 filed on Mar. 24, 2017. The entire contents of these applications are hereby incorporated herein by reference.

BACKGROUND OF THE INVENTION

1. Field of the Invention

The present invention relates to a medium used in forming an external electrode including a baked electrode layer in an electronic component body and a method of manufacturing an electronic component.

2. Description of the Related Art

For example, Japanese Patent Laying-Open No. 2012-134286 discloses a method of manufacturing a multilayer ceramic capacitor as an electronic component. In the method of manufacturing a multilayer ceramic capacitor disclosed in Japanese Patent Laying-Open No. 2012-134286, a paste contained in glass is attached to an end surface of a multilayer body as an electronic component body substantially in a shape of a parallelepiped by immersing the end surface in the paste. By baking the paste attached to the end surface after drying the paste, a baked electrode layer as an underlying electrode which forms a part of an external electrode is provided on the end surface. Thereafter, a glass component which has floated up to a surface of the baked electrode layer is removed.

In the method of manufacturing a multilayer ceramic capacitor disclosed in Japanese Patent Laying-Open No. 2012-134286, sandblasting is used for removal of the glass component. In sandblasting, a plurality of multilayer bodies are placed in a barrel and the barrel is rotated while abrasive powders are blown from the outside of the barrel. Since excessive force is applied to the multilayer bodies as a result of rotation of the barrel, the multilayer bodies are chipped and characteristics as a capacitor may not be satisfied.

A state of a surface of the baked electrode layer polished in sandblasting is poor and the baked electrode layer may peel off in a corner portion of the multilayer body.

SUMMARY OF THE INVENTION

Preferred embodiments of the present invention provide methods of manufacturing electronic components that achieve significantly reduced or no fracture and chipping of a multilayer body and reform a surface of a baked electrode layer provided in the multilayer body.

Preferred embodiments of the present invention also provide media that are able to reform a surface of an underlying electrode layer provided in an electronic component body.

A method of manufacturing an electronic component according to a preferred embodiment of the present invention includes introducing a plurality of multilayer bodies and media into a container, the plurality of multilayer bodies each including a first end surface and a second end surface opposed to each other in a direction of length, a first side surface and a second side surface opposed to each other in a direction of width perpendicular or substantially perpendicular to the direction of length, and a first main surface and a second main surface opposed to each other in a direction of height perpendicular or substantially perpendicular to the direction of length and the direction of width, the first end surface being provided with a first baked electrode layer, and the second end surface being provided with a second baked electrode layer, and applying vibration energy to the plurality of multilayer bodies and the media. A container including a bottom portion and a circumferential wall portion connected to a circumferential edge of the bottom portion is used as the container. When an annular virtual axis circumferentially surrounding a central axis of the bottom portion is assumed in a state before vibration of the container, in the applying vibration energy to the plurality of multilayer bodies and the media, vibration is applied to the multilayer bodies and the media such that the multilayer bodies and the media follow a helical trace helically surrounding the virtual axis along an axial direction of the virtual axis.

In a method of manufacturing an electronic component according to a preferred embodiment of the present invention, a frequency of the vibration applied to the container resonates with a natural frequency of the container.

In a method of manufacturing an electronic component according to a preferred embodiment of the present invention, preferably, a material containing any metal of Cu, Ag, Ni, Pd, an Ag—Pd alloy, and Au is used for the first baked electrode layer and the second baked electrode layer.

In a method of manufacturing an electronic component according to a preferred embodiment of the present invention, preferably, a total of volumes of the plurality of multilayer bodies introduced into the container is at most about ½ of a total of volumes of the media introduced into the container.

A medium according to a preferred embodiment of the present invention is used in forming an external electrode including an underlying electrode layer in an electronic component body. The medium is accommodated in a container together with the electronic component body including the underlying electrode layer. The medium treats a surface of the underlying electrode layer as a result of application of vibration to the container. The medium is spherical or substantially spherical. The medium has a diameter not smaller than about 0.2 mm and not greater than about 2.0 mm, for example. The medium contains tungsten.

A medium according to a preferred embodiment of the present invention preferably has surface roughness Sa not greater than about 190 nm, for example.

A medium according to a preferred embodiment of the present invention preferably has a specific gravity not lower than 5 and not higher than 18.

A medium according to a preferred embodiment of the present invention preferably has a diameter not smaller than about 0.4 mm and not greater than about 1.0 mm.

A medium according to a preferred embodiment of the present invention preferably further includes cobalt and/or chromium.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15 is a diagram showing a condition and a result in a first verification experiment conducted for verifying advantageous effects of the preferred embodiments of the present invention.

FIG. 23 is a diagram showing a condition and a result of a second verification experiment conducted for verifying advantageous effects of the preferred embodiments of the present invention.

FIG. 24 is a diagram showing one example of surface roughness of a medium used in the second verification experiment.

DETAILED DESCRIPTION OF THE PREFERRED EMBODIMENTS

Figure 1:
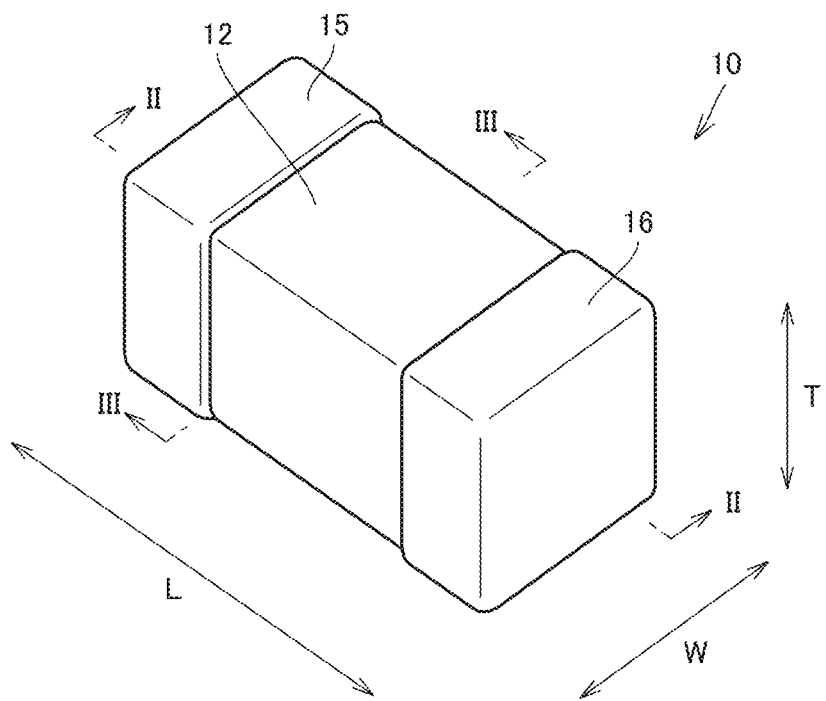
FIG. 1 is a perspective view of a multilayer ceramic capacitor manufactured in accordance with a method of manufacturing a multilayer ceramic capacitor according to a first preferred embodiment of the present invention.

Preferred embodiments of the present invention will be described below in detail with reference to the drawings. The preferred embodiments shown below exemplify a multilayer ceramic capacitor as an electronic component and exemplify a method of manufacturing a multilayer ceramic capacitor as a method of manufacturing an electronic component. In the preferred embodiments shown below, the same or common elements have the same reference characters allotted and description thereof will not be repeated.

First Preferred Embodiment

Prior to describing a method of manufacturing a multilayer ceramic capacitor according to a preferred embodiment of the present invention, initially, a multilayer ceramic capacitor manufactured in accordance with the manufacturing method will be described.

Figure 2:
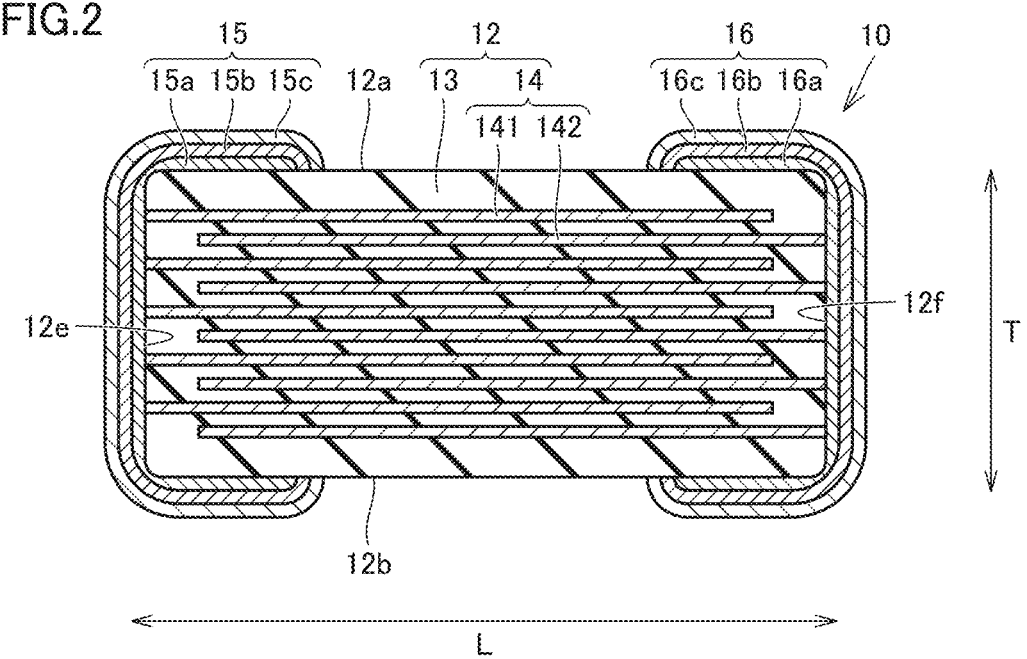
FIG. 2 is a cross-sectional view along the line II-II of the multilayer ceramic capacitor shown in FIG. 1.
Figure 3:
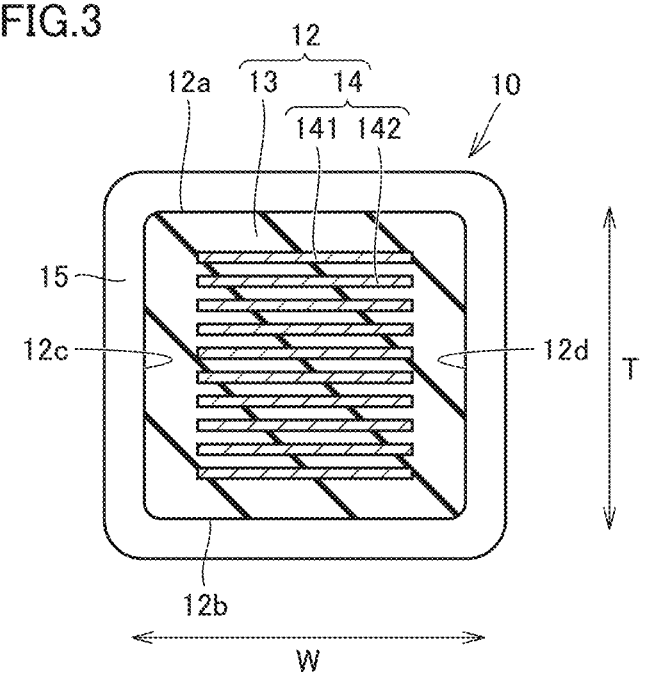
FIG. 3 is a cross-sectional view along the line III-III of the multilayer ceramic capacitor shown in FIG. 1.

FIG. 1 is a perspective view of a multilayer ceramic capacitor manufactured in accordance with a method of manufacturing a multilayer ceramic capacitor according to a first preferred embodiment. FIG. 2 is a cross-sectional view along the line II-II of the multilayer ceramic capacitor shown in FIG. 1. FIG. 3 is a cross-sectional view along the line III-III of the multilayer ceramic capacitor shown in FIG. 1.

As shown in FIGS. 1 to 3, a multilayer ceramic capacitor 10 includes a multilayer body 12 defining an electronic component body, a first external electrode 15, and a second external electrode 16.

Multilayer body 12 has an outer geometry substantially in a shape of a parallelepiped. Multilayer body 12 includes a plurality of dielectric layers 13 and a plurality of internal electrode layers 14 which are stacked on one another. Multilayer body 12 includes a first side surface 12c and a second side surface 12d as being opposed to each other in a direction of width W, a first main surface 12a and a second main surface 12b as being opposed to each other in a direction of height T perpendicular or substantially perpendicular to direction of width W, and a first end surface 12e and a second end surface 12f as being opposed to each other in a direction of length L perpendicular or substantially perpendicular to both of direction of width W and direction of height T.

Though multilayer body 12 has an outer geometry substantially in a shape of a parallelepiped, it preferably includes a corner portion and a ridgeline portion rounded. The corner portion is a portion where three surfaces of multilayer body 12 meet one another and the ridgeline portion is a portion where two surfaces of multilayer body 12 meet each other. Projections and recesses may be provided in at least any one of first main surface 12a, second main surface 12b, first side surface 12c, second side surface 12d, first end surface 12e, and second end surface 12f.

The outer geometry of multilayer body 12 has, for example, a dimension in the direction of length L not smaller than about 0.2 mm and not greater than about 5.7 mm, a dimension in the direction of width W not smaller than about 0.1 mm and not greater than about 5.0 mm, and a dimension in the direction of height T not smaller than about 0.1 mm and not greater than about 5.0 mm. The dimension of the outer geometry of multilayer ceramic capacitor 10 can be measured with a micrometer.

Multilayer body 12 is divided into a pair of outer portions and an inner portion in the direction of height T. One of the pair of outer portions is a portion including first main surface 12a of multilayer body 12 and includes dielectric layer 13 located between first main surface 12a and a first internal electrode layer 141 closest to first main surface 12a which will be described later. The other of the pair of outer portions is a portion including second main surface 12b of multilayer body 12 and includes dielectric layer 13 located between second main surface 12b and a second internal electrode layer 142 closest to second main surface 12b which will be described later.

The inner portion is a region lying between the pair of outer portions. The inner portion includes a plurality of dielectric layers 13 not defining the outer portions and all internal electrode layers 14.

The number of stacked dielectric layers 13 is preferably not smaller than 20 and not greater than 1000. Each of the pair of outer portions has a thickness preferably not smaller than about 30 μm and not greater than about 850 μm, for example. Each of the plurality of dielectric layers 13 included in the inner portion has a thickness preferably not smaller than about 0.3 μm and not greater than about 30 μm, for example.

Dielectric layer 13 is composed of a perovskite-type compound containing Ba or Ti. Dielectric ceramics mainly composed of $BaTiO_3$, $CaTiO_3$, $SrTiO_3$, or $CaZrO_3$ can be used as a material to form dielectric layer 13. A material in which a sub component such as an Mn compound, an Mg compound, an Si compound, an Fe compound, a Cr compound, a Co compound, an Ni compound, an Al compound, a V compound, or a rare-earth compound is added to such a main component may be used.

A plurality of internal electrode layers 14 include a plurality of first internal electrode layers 141 connected to first external electrode 15 and a plurality of second internal electrode layers 142 connected to second external electrode 16.

The number of stacked internal electrode layers 14 is preferably not smaller than 10 and not greater than 1000. Each of the plurality of internal electrode layers 14 has a thickness preferably not smaller than about 0.3 μm and not greater than about 1.0 μm, for example.

One metal selected from the group consisting of Ni, Cu, Ag, Pd, and Au can be used as a material for internal electrode layer 14. Internal electrode layer 14 may contain particles of a dielectric identical in composition base to dielectric ceramics contained in dielectric layer 13.

First internal electrode layer 141 and second internal electrode layer 142 are alternately arranged at a regular interval in the direction of width W of multilayer body 12. First internal electrode layer 141 and second internal electrode layer 142 are arranged as being opposed to each other with dielectric layer 13 being interposed.

First internal electrode layer 141 includes a first opposed electrode portion opposed to second internal electrode layer 142 and a first extracted electrode portion extracted from the first opposed electrode portion toward first end surface 12e of multilayer body 12.

Second internal electrode layer 142 includes a second opposed electrode portion opposed to first internal electrode layer 141 and a second extracted electrode portion extracted from the second opposed electrode portion toward second end surface 12f of multilayer body 12.

Dielectric layer 13 is located between the opposed electrode portion of first internal electrode layer 141 and the opposed electrode portion of second internal electrode layer 142 so that a capacitance is generated. A function of a capacitor is thus provided.

In multilayer body 12, when viewed in the direction of height T of multilayer body 12, a position between the opposed electrode portion and first side surface 12c is defined as a first side margin and a position between the opposed electrode portion and second side surface 12d is defined as a second side margin. When viewed in the direction of height T of multilayer body 12, a position between the opposed electrode portion and first end surface 12e is defined as a first end margin and a position between the opposed electrode portion and second end surface 12f is defined as a second end margin.

The first end margin includes the first extracted electrode portion of first internal electrode layer 141 and a plurality of dielectric layers 13 adjacent thereto. The second end margin includes the second extracted electrode portion of second internal electrode layer 142 and a plurality of dielectric layers 13 adjacent thereto.

First external electrode 15 is provided on first end surface 12e. More specifically, first external electrode 15 extends from first end surface 12e to first main surface 12a and second main surface 12b as well as to first side surface 12c and second side surface 12d.

Second external electrode 16 is provided on second end surface 12f. More specifically, second external electrode 16 extends from second end surface 12f to first main surface 12a and second main surface 12b as well as to first side surface 12c and second side surface 12d.

First external electrode 15 includes a first baked electrode layer 15a as an underlying electrode layer and a plating layer 15b and a plating layer 15c provided on first baked electrode layer 15a.

Second external electrode 16 includes a second baked electrode layer 16a as an underlying electrode layer and a plating layer 16b and a plating layer 16c provided on second baked electrode layer 16a.

First baked electrode layer 15a and second baked electrode layer 16a contain pores and glass and a metal. Examples of the metal contained in first baked electrode layer 15a and second baked electrode layer 16a include an appropriate metal such as Ni, Cu, Ag, Pd, Au, and an Ag—Pd alloy. Highly malleable Cu and Ag are suitably used as the metal. A metal contained in first baked electrode layer 15a and second baked electrode layer 16a can be determined with a wavelength-dispersive X-ray spectroscope (WDX) after multilayer ceramic capacitor 10 is polished. In polishing, for example, a cross-section perpendicular or substantially perpendicular to direction of width W is exposed by polishing multilayer ceramic capacitor 10 to a position in the center in the direction of width W.

First baked electrode layer 15a and second baked electrode layer 16a may include a plurality of stacked layers. First baked electrode layer 15a and second baked electrode layer 16a are layers obtained by applying a conductive paste containing glass and a metal to multilayer body 12 and baking the conductive paste. First baked electrode layer 15a and second baked electrode layer 16a may be formed by being fired simultaneously with internal electrode layer 14 or by being baked after firing of internal electrode layer 14.

First baked electrode layer 15a and second baked electrode layer 16a have a maximum thickness preferably not smaller than about 10 μm and not greater than about 200 μm, for example. A thickness of first baked electrode layer 15a and second baked electrode layer 16a is small in a corner portion of multilayer body 12.

Details of first baked electrode layer 15a and second baked electrode layer 16a will be described later with reference to FIG. 4.

Plating layers 15b, 15c, 16b, and 16c are composed of one metal selected from the group consisting of Ni, Cu, Ag, Pd, Au, and Sn or an alloy containing such a metal.

For example, plating layer 15b and plating layer 16b are Ni plating layers and plating layers 15c and 16c are, for example, Sn plating layers. The Ni plating layer has a function to prevent the underlying electrode layer from being eroded by solder in mounting of a multilayer ceramic capacitor. The Sn plating layer has a function to improve solderability in mounting of a multilayer ceramic capacitor and to facilitate mounting of the multilayer ceramic capacitor. One plating layer has a thickness preferably not smaller than about 1.5 μm and not greater than about 15.0 μm, for example. The plating layer may include a single layer, and may include a Cu plating layer or an Au plating layer.

Figure 4:
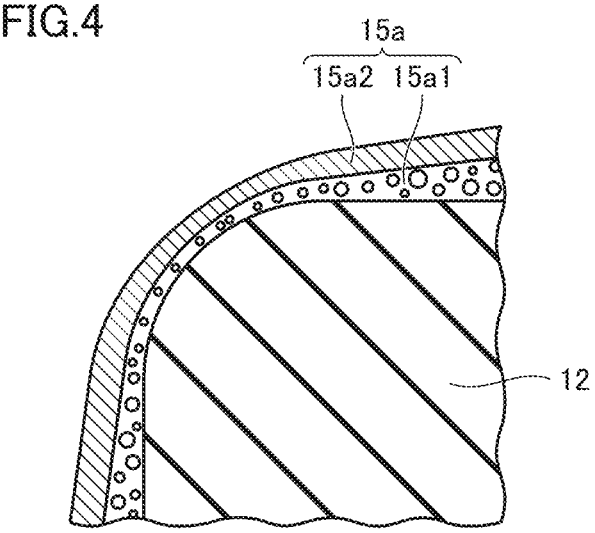
FIG. 4 is a partial cross-sectional view showing details of a baked electrode layer of the multilayer ceramic capacitor according to the first preferred embodiment of the present invention.

FIG. 4 is a partial cross-sectional view showing details of the baked electrode layer of the multilayer ceramic capacitor according to the first preferred embodiment. A circular object included in first baked electrode layer 15a shown in FIG. 4 represents a pore or glass. Details of first baked electrode layer 15a will be described with reference to FIG. 4. Since second baked electrode layer 16a is similar in construction to first baked electrode layer 15a, description thereof will not be provided.

As shown in FIG. 4, first baked electrode layer 15a includes a first region 15a1 and a second region 15a2 from a side of multilayer body 12 toward a surface layer of first baked electrode layer 15a.

First region 15a1 contains pores and glass to a considerable extent. First region 15a1 occupies a major portion of first baked electrode layer 15a. As first region 15a1 contains pores, first baked electrode layer 15a has cushioning properties. External impact applied to multilayer ceramic capacitor 10 is thus able to be absorbed.

Second region 15a2 is high in density of a metal in a direction of thickness from a surface layer. Second region 15a2 contains substantially no glass and pores. A surface of second region 15a2 is constructed to be smooth. Second region 15a2 has a thickness at least not smaller than about 0.1 μm and not greater than about 10 μm, for example. By setting a thickness of second region 15a2 to about 0.1 μm or greater and forming a dense metal film on the surface of the first baked electrode layer and the second baked electrode layer, attaching properties of plating are able to be improved or intrusion by plating is able to be significantly reduced or prevented, and therefore reliability of multilayer ceramic capacitor 10 is significantly improved. As will be described later, second region 15a2 is provided by using a surface treatment apparatus 100 (see FIG. 6) to rub a medium 20 (see FIG. 11) against a surface layer of a baked electrode. Therefore, by setting a thickness of second region 15a2 to about 10 μm or smaller, damage to multilayer body 12 is able to be significantly reduced or prevented, and chipping and fracture of multilayer body 12 are significantly reduced or prevented.

A thickness of second region 15a2 can be measured through observation with an SEM after multilayer ceramic capacitor 10 is polished. Specifically, for example, a cross-section along direction of length L and direction of height T is exposed by polishing multilayer ceramic capacitor 10 to a position approximately ½ of a dimension in the direction of width W, and a thickness from a corner portion connecting first end surface 12e and first main surface 12a to each other to a vertex of second region 15a2 located on the corner portion is measured. An average value of thicknesses of second regions 15a2 obtained from ten multilayer ceramic capacitors 10 is preferably defined as a thickness of second region 15a2.

Second region 15a2 covers first region 15a1. Second region 15a2 high in density of the metal is provided on a side of the surface layer so that moisture resistance of multilayer body 12 is able to be improved. The surface of second region 15a2 is constructed to be smooth so that occurrence of a defect in plating layer 15b and plating layer 15c in formation of plating layer 15b and plating layer 15c is able to significantly reduced or prevented. Continuity between plating layer 15b and plating layer 15c is able to be improved.

Second region 15a2 is formed by subjecting first baked electrode layer 15a and second baked electrode layer 16a to surface treatment in a step of surface treatment of the baked electrode layer which will be described later.

Figure 5:
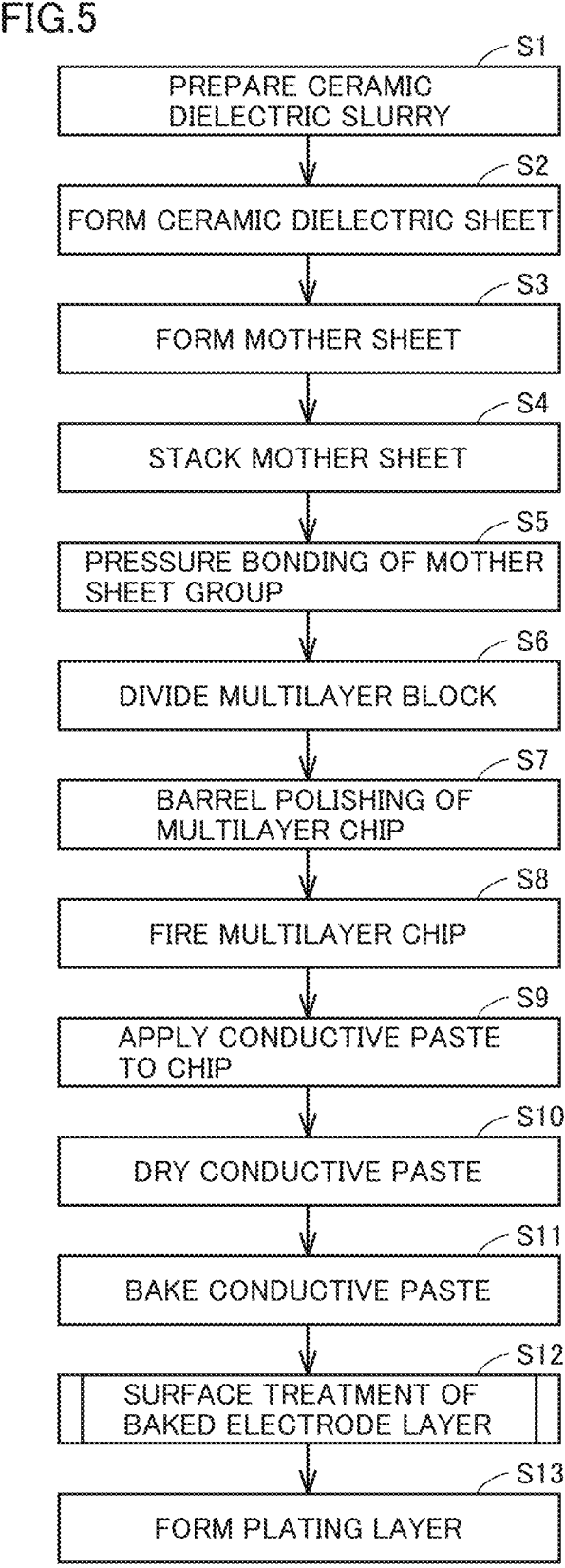
FIG. 5 is a flowchart showing the method of manufacturing a multilayer ceramic capacitor according to the first preferred embodiment of the present invention.

FIG. 5 is a flowchart showing the method of manufacturing a multilayer ceramic capacitor according to the first preferred embodiment. The method of manufacturing a multilayer ceramic capacitor according to the first preferred embodiment will be described with reference to FIG. 5.

As shown in FIG. 5, in manufacturing multilayer ceramic capacitor 10, initially, in a step S1, ceramic dielectric slurry is prepared. Specifically, the ceramic dielectric slurry is prepared by mixing ceramic dielectric powders, additive powders, and a binder resin with a solution as being dispersed therein. The ceramic dielectric slurry may be based on any of a solvent and water. When a water-based paint is used for the ceramic dielectric slurry, the ceramic dielectric slurry is prepared by mixing a water-soluble binder and a dispersant with a dielectric source material dissolved in water.

Then, in a step S2, a ceramic dielectric sheet is formed. Specifically, the ceramic dielectric sheet is formed by forming the ceramic dielectric slurry into a sheet on a carrier film by using a die coater, a gravure coater, or a microgravure coater and drying the ceramic dielectric slurry. The ceramic dielectric sheet has a thickness preferably not greater than about 3 μm from a point of view of reduction in size and a higher capacity of multilayer ceramic capacitor 10, for example.

Then, in a step S3, a mother sheet is formed. Specifically, a mother sheet provided with a prescribed internal electrode pattern is provided on the ceramic dielectric sheet by applying a conductive paste to the ceramic dielectric sheet to have a prescribed pattern. Screen printing, ink jet printing, or gravure printing can be used as a method of applying the conductive paste. The internal electrode pattern has a thickness preferably not greater than about 1.5 μm from a point of view of reduction in size and a higher capacity of multilayer ceramic capacitor 10, for example. In addition to the mother sheet having an internal electrode pattern, a ceramic dielectric sheet which is not subjected to step S3 is also prepared as the mother sheet.

Then, in a step S4, a plurality of mother sheets are stacked. Specifically, a prescribed number of mother sheets not having the internal electrode pattern formed thereon but consisting of the ceramic dielectric sheet are stacked. A prescribed number of mother sheets provided with the internal electrode pattern are stacked thereon. A prescribed number of mother sheets not having the internal electrode pattern formed thereon but consisting of the ceramic dielectric sheet are further stacked thereon. A mother sheet group is thus formed.

Then, in a step S5, a multilayer block is formed by pressure bonding the mother sheet group. Specifically, the multilayer block is formed by applying a pressure to the mother sheet group in a direction of stack by a hydrostatic press or a rigid press to pressure-bond the mother sheet group.

Then, in a step S6, multilayer chips are formed by dividing the multilayer block. Specifically, the multilayer block is divided into a matrix by cutting by pushing, dicing, or laser cutting, so that the multilayer block is divided into a plurality of individual multilayer chips.

Then, in a step S7, the multilayer chips are subjected to barrel polishing. Specifically, the multilayer chips are polished by sealing the multilayer chips in a small box called a barrel together with medium balls higher in hardness than a dielectric material and rotating the barrel. The corner portion and the ridgeline portion of the multilayer chip are thus rounded.

Then, in a step S8, the multilayer chip is fired. Specifically, multilayer body 12 is formed by heating the multilayer chip and thus firing a dielectric material and a conductive material contained in the multilayer chip. A temperature for firing is set as appropriate in accordance with the dielectric material and the conductive material and is preferably not lower than about 900° C. and not higher than about 1300° C., for example.

Then, in a step S9, a conductive paste is applied to first end surface 12e and second end surface 12f of multilayer body 12 through immersion. The conductive paste contains glass and a disappearing agent such as a resin in addition to conductive fine particles.

Then, in a step S10, the conductive paste applied to multilayer body 12 is dried. Specifically, the conductive paste is dried with hot air for approximately ten minutes, for example, at a temperature not lower than about 60° C. and not higher than about 180° C.

Then, in a step S11, the dried conductive paste is baked. A temperature for baking is preferably not lower than about 700° C. and not higher than about 900° C. In this baking step, the disappearing agent disappears so that a plurality of pores are formed in the baked electrode layer. In a state after step S11, the baked electrode layer is in a state of first region 15a1 described above from the side of multilayer body 12 toward the surface layer. The side of the surface layer of the baked electrode layer is also provided with pores and contains glass.

Then, in a step S12, the baked electrode layer is subjected to surface treatment. The surface layer of the baked electrode layer is polished by rubbing media 20 which will be described later (see FIG. 11) against the surface layer of the baked electrode layer by agitating the multilayer bodies provided with the baked electrode layer and media 20 in an agitation vessel 150 which will be described later. Glass contained in the surface layer of the baked electrode is thus reduced and the surface layer of the baked electrode layer is planarized. Consequently, a state of the surface layer of the baked electrode layer is reformed and second region 15a2 described above which is high in density of the metal and has a smooth surface is formed. Details of surface treatment will be described with reference to FIGS. 6 to 10.

Figure 6:
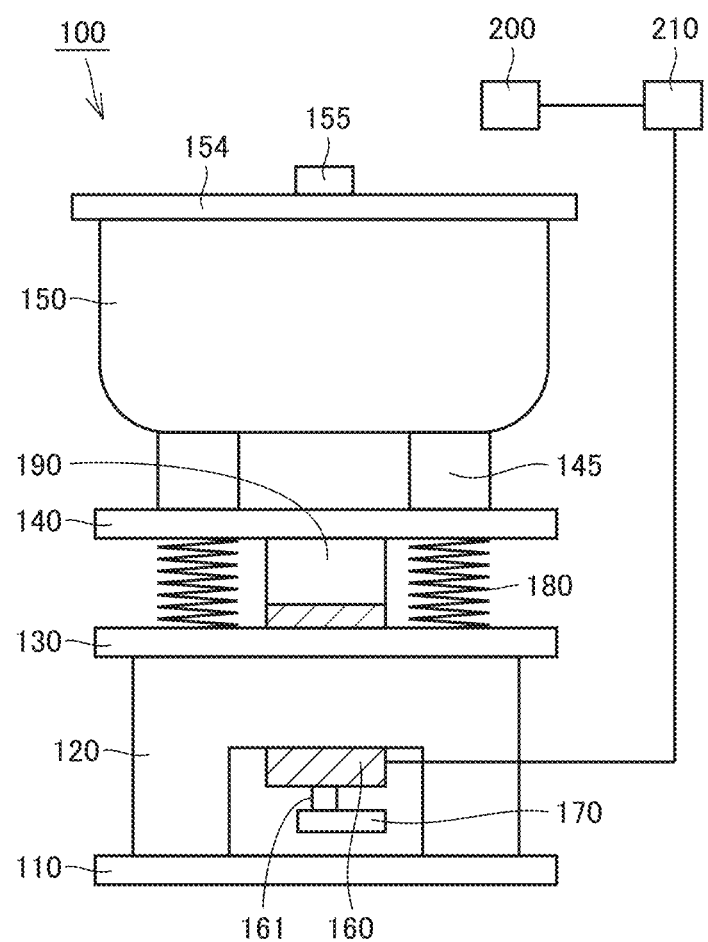
FIG. 6 is a diagram showing a surface treatment apparatus for performing surface treatment of the baked electrode layer shown in FIG. 5.
Figure 7:
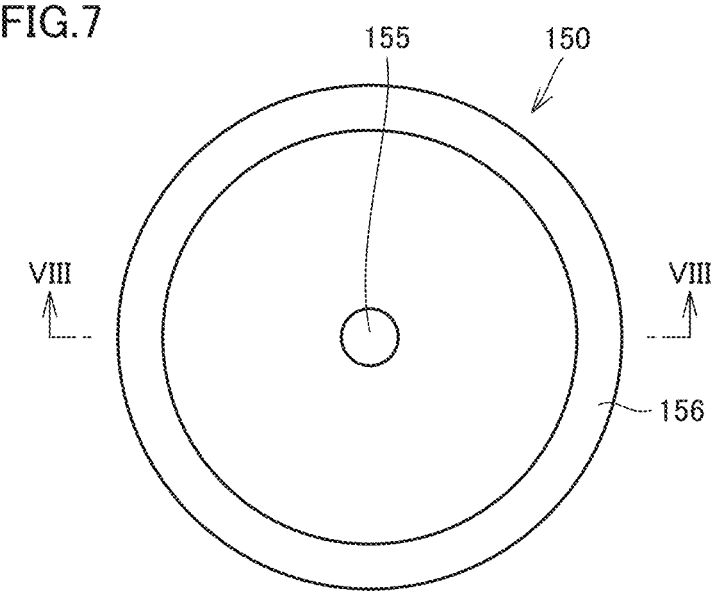
FIG. 7 is a plan view of an agitation vessel shown in FIG. 6.
Figure 8:
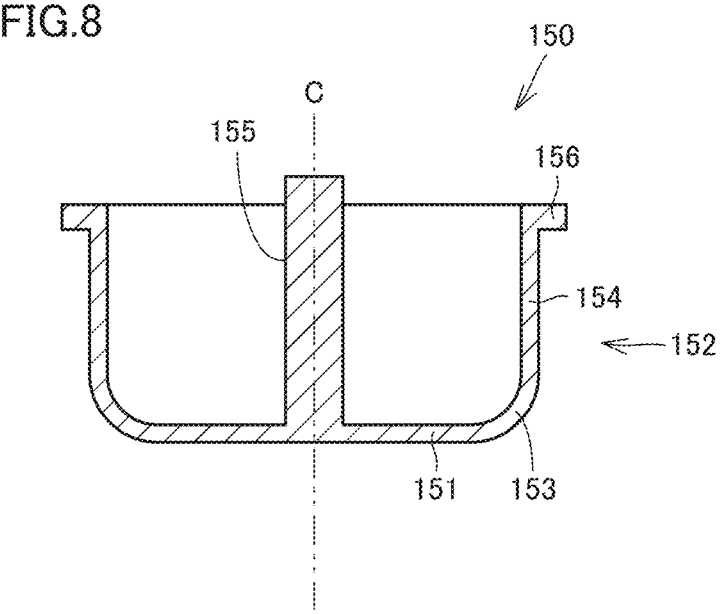
FIG. 8 is a cross-sectional view of the agitation vessel shown in FIG. 6.
Figure 9:
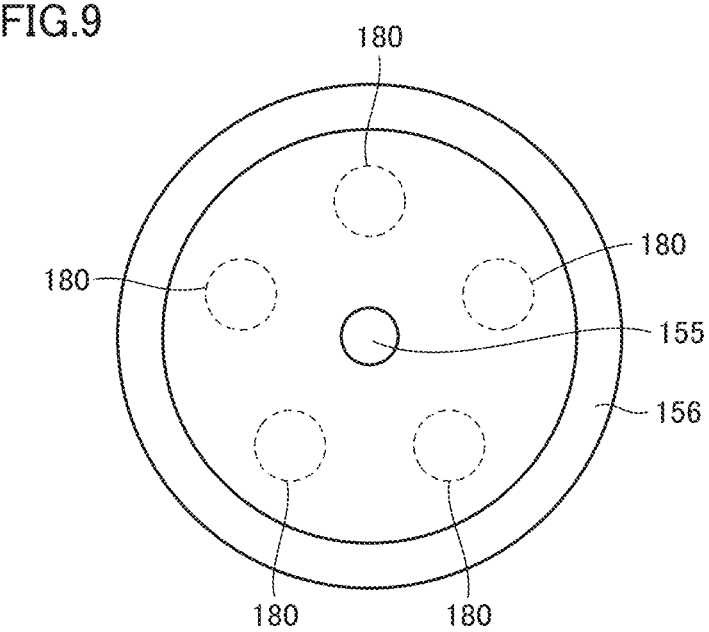
FIG. 9 is a plan view showing positional relation between the agitation vessel shown in FIG. 6 and an elastic member.

FIG. 6 is a diagram showing the surface treatment apparatus for performing surface treatment of the baked electrode layer shown in FIG. 5. FIG. 7 is a plan view of the agitation vessel shown in FIG. 6. FIG. 8 is a cross-sectional view of the agitation vessel shown in FIG. 6. FIG. 9 is a plan view showing positional relation between the agitation vessel shown in FIG. 6 and an elastic member. Surface treatment apparatus 100 used in step S12 will be described with reference to FIGS. 6 to 9.

As shown in FIG. 6, surface treatment apparatus 100 includes a first base portion 110, a second base portion 120, a third base portion 130, a vibration reception plate 140, agitation vessel 150 as a container, a drive motor 160, an eccentric load 170, a plurality of elastic members 180, a drive motor support portion 190, a sensor 200 which senses a state of vibration of agitation vessel 150, and a drive motor controller 210.

First base portion 110 is in a shape of a plate. First base portion 110 defines a lower portion of surface treatment apparatus 100. First base portion 110 is placed on a floor surface and keeps levelness of surface treatment apparatus 100.

Second base portion 120 is substantially in a shape of a parallelepiped. Second base portion 120 defines and functions as a base to support loads imposed by vibration reception plate 140 and agitation vessel 150 as well as drive motor 160 and eccentric load 170 supported on vibration reception plate 140. Second base portion 120 is constructed such that drive motor 160 is able to pass therethrough.

Third base portion 130 is in a shape of a plate. Third base portion 130 is carried on second base portion 120. Third base portion 130 is constructed such that drive motor 160 is able to pass therethrough.

First base portion 110, second base portion 120, and third base portion 130 may be formed of independent different members or may be formed integrally.

Vibration reception plate 140 is substantially in a shape of a plate. Vibration reception plate 140 is supported by a plurality of elastic members 180. Drive motor support portion 190 is provided on a lower surface side of vibration reception plate 140. Drive motor support portion 190 supports drive motor 160 to which eccentric load 170 is rotatably attached. Loads imposed by drive motor 160 and eccentric load 170 are thus applied to vibration reception plate 140 with drive motor support portion 190 being interposed.

An agitation vessel carrying portion 145 is provided on an upper surface side of vibration reception plate 140. Agitation vessel 150 is carried on agitation vessel carrying portion 145.

As shown in FIGS. 6 to 8, agitation vessel 150 is in a shape of a cylinder with a bottom. Agitation vessel 150 includes a bottom portion 151, a circumferential wall portion 152, a shaft portion 155, and a flange portion 156.

Bottom portion 151 is substantially in a shape of a disc. Bottom portion 151 is constructed to be flat. Bottom portion 151 does not have to be flat. Circumferential wall portion 152 is connected to a circumferential edge of bottom portion 151. Circumferential wall portion 152 is erected upward from the circumferential edge of bottom portion 151. Circumferential wall portion 152 includes a curved portion 153 connected to bottom portion 151 and a cylindrical portion 154 which linearly extends along a vertical direction. Flange portion 156 protruding in a radial direction is provided at an upper end of cylindrical portion 154.

Shaft portion 155 is provided in a central portion of bottom portion 151. Shaft portion 155 extends along the vertical direction. Shaft portion 155 does not have to be provided.

Agitation vessel 150 is not limited to the shape of the cylinder with the bottom, and may be in a shape of a hemisphere or a bowl. When agitation vessel 150 is hemispherical, bottom portion 151 forms a lower side of the hemisphere and circumferential wall portion 152 defines an upper side of the hemisphere. Alternatively, when agitation vessel 150 is in a shape of a bowl, it has such a curved shape that bottom portion 151 expands downward.

As will be described later, a plurality of multilayer bodies each having the baked electrode layer formed and media 20 are introduced into agitation vessel 150.

A flexible coating layer made of urethane or the like is preferably provided on an inner surface of agitation vessel 150. In particular, when a large multilayer body of which length dimension is greater than about 2.0 mm, width dimension is greater than about 1.2 mm, and thickness dimension is greater than about 1.2 mm is handled, chipping and fracture of the multilayer body may occur and hence an elastic member such as rubber is preferably used as a coating layer.

When a small multilayer body of which length dimension is not greater than about 2.0 mm, width dimension is not greater than about 1.2 mm, and thickness dimension is not greater than about 1.2 mm is handled, concerns about fracture and chipping are less and hence a coating layer does not have to be provided.

Agitation vessel 150 is preferably removably carried on agitation vessel carrying portion 145. When a small multilayer body as described above is handled, the inside of agitation vessel 150 is able to be cleaned by removing agitation vessel 150. Thus, introduction of chips is prevented.

Agitation vessel 150, agitation vessel carrying portion 145, and vibration reception plate 140 may be formed separately or integrally.

As shown in FIGS. 6 and 9, a plurality of elastic members 180 are arranged at a prescribed pitch in a circumferential direction around shaft portion 155 when viewed in a direction of extension of shaft portion 155. The plurality of elastic members 180 are fixed onto base portion 130.

As shown in FIG. 6, drive motor 160 includes a rotation shaft 161 extending in the vertical direction. Drive motor 160 rotates eccentric load 170 attached to rotation shaft 161 around the rotation shaft by rotating rotation shaft 161.

As a position of the center of gravity of vibration reception plate 140 is varied with rotation of eccentric load 170, extension and contraction of the plurality of elastic members 180 becomes uneven. By making use of such uneven extension and contraction of the plurality of elastic members 180, agitation vessel 150 is able to be caused to vibrate as described above.

Sensor 200 senses a state of vibration of agitation vessel 150. A result of sensing by sensor 200 is input to drive motor controller 210. For example, an acceleration sensor or a laser displacement sensor is used as sensor 200.

When an acceleration sensor is used as sensor 200, a state of vibration of agitation vessel 150 is able to be sensed by directly measuring an acceleration of medium 20 during vibration. For example, GH313A or GH613 (each of which is manufactured by Keyence Corporation) as a sensor head and GA-245 (manufactured by Keyence Corporation) as an amplifier unit can be adopted for the acceleration sensor.

An acceleration of medium 20 is preferably not lower than about 2.5 G and not higher than about 20.0 G, for example. When the acceleration of medium 20 is lower than about 2.5 G, sufficient energy for rolling a metal contained in the baked electrode layer cannot be obtained. When the acceleration of medium 20 is higher than about 20.0 G, damage to the multilayer body is great.

When a laser displacement sensor is used as sensor 200, a state of vibration of agitation vessel 150 is able to be sensed by measuring an amount of movement of agitation vessel 150 by emitting laser beams to agitation vessel 150.

By thus measuring an acceleration of medium 20 or an amount of movement of agitation vessel 150, a state of vibration of agitation vessel 150, more specifically a frequency of agitation vessel 150, is able to be sensed.

Drive motor controller 210 controls an operation of drive motor 160 based on a result of sensing by sensor 200.

Figure 10:
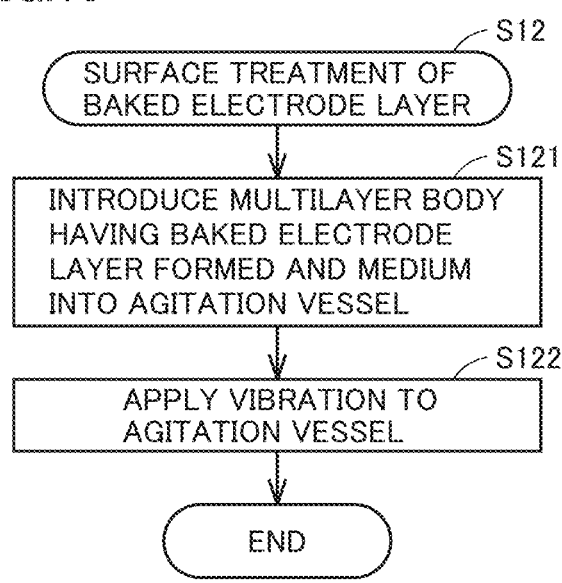
FIG. 10 is a flowchart showing details of a step of surface treatment of the baked electrode layer shown in FIG. 5.

FIG. 10 is a flowchart showing details of the step of surface treatment of the baked electrode layer shown in FIG. 5. Details of step S12 of surface treatment of the baked electrode layer will be described with reference to FIG. 10.

As shown in FIG. 10, in step S12 of surface treatment of the baked electrode layer, initially, in a step S121, a plurality of multilayer bodies 12 and media (not shown in FIG. 10) are introduced into agitation vessel 150, the plurality of multilayer bodies 12 each including first end surface 12e and second end surface 12f opposed to each other, first side surface 12c and second side surface 12d opposed to each other, and first main surface 12a and second main surface 12b opposed to each other, first end surface 12e being provided with first baked electrode layer 15a, and second end surface 12f being provided with second baked electrode layer 16a.

Medium 20 is spherical. A diameter of medium 20 is preferably smaller than a diagonal of first end surface 12e and second end surface 12f. With such a diameter, medium 20 and the multilayer body can readily be separated from each other by using a meshed sieve.

For example, tungsten or zirconium can be used as a material for medium 20. Medium 20 may contain tungsten or zirconium. Cemented carbide containing cobalt and/or chromium and tungsten may be used as a material for medium 20. Medium 20 may further contain cobalt and/or chromium in addition to tungsten.

Reforming energy for reforming first baked electrode layer 15a and the second baked electrode layer by having media 20 collide against first baked electrode layer 15a and second baked electrode layer 16a provided in multilayer body 12 as will be described later can be expressed as a product of collision energy and a frequency of collision.

Higher reforming energy is obtained by extending a time period (a process time period) for applying vibration to multilayer bodies 12 and media 20 as will be described later. Collision energy (kinetic energy), however, is in proportion to a mass of media 20, and hence the process time period can be reduced by increasing a mass of media 20.

Since tungsten is higher in specific gravity than zirconium, by using tungsten as medium 20, a mass can be increased as compared with an example of using zirconium even though the diameter is the same. The process time period can thus be reduced.

Medium 20 has a diameter preferably not smaller than about 0.2 mm and not greater than about 2.0 mm and preferably not smaller than about 0.4 mm and not greater than about 1.0 mm.

When medium 20 has too small a diameter, kinetic energy of medium 20 is low and a metal exposed at the surface layer of the baked electrode layer cannot sufficiently be rolled. When a diameter is too large, kinetic energy of medium 20 is high and multilayer body 12 is damaged.

Medium 20 preferably has a smooth surface and has surface roughness Sa preferably not greater than 200 nm and more preferably not greater than 190 nm.

Medium 20 has a specific gravity preferably not lower than 5 and not higher than 18. When a specific gravity is too low, kinetic energy of medium 20 is low and a metal exposed at the surface layer of the baked electrode layer cannot sufficiently be rolled. When a specific gravity is too high, the multilayer body is damaged.

Medium 20 has a Vickers hardness preferably not lower than 1000 HV and not higher than 2500 HV. When the hardness is too low, medium 20 will break. When the hardness is too high, the multilayer body is damaged.

A total of volumes of a plurality of multilayer bodies 12 introduced into agitation vessel 150 is preferably at most ½ and further preferably at most ⅓ of the total of volumes of media 20 introduced into agitation vessel 150. When an amount of the plurality of multilayer bodies 12 with respect to media 20 is excessively large, workability by media 20 becomes poor and hence a crack may be produced in a corner portion of multilayer body 12 or multilayer body 12 may be chipped or broken.

In a step S122, vibration energy is applied to the plurality of multilayer bodies 12 and media 20 by causing agitation vessel 150 to vibrate. Specifically, agitation vessel 150 is caused to vibrate by surface treatment apparatus 100.

Figure 11:
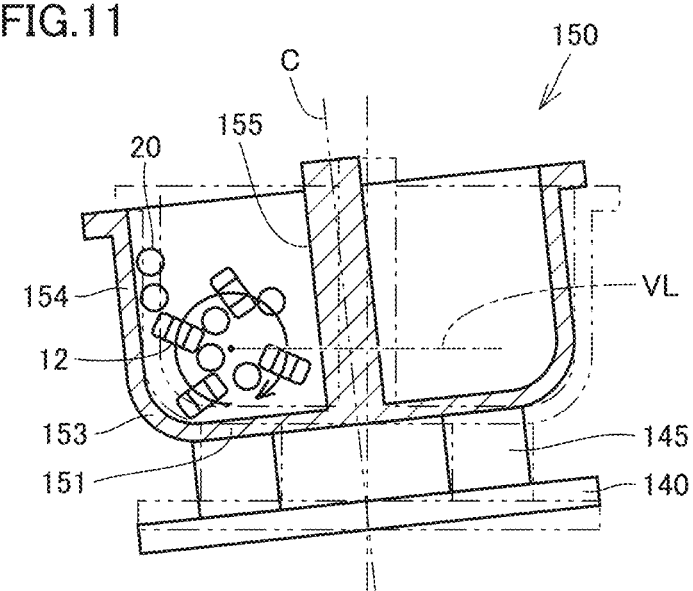
FIG. 11 is a diagram showing a step of applying vibration energy to a plurality of multilayer bodies and media in the step of applying vibration to the agitation vessel shown in FIG. 10.

FIG. 11 is a diagram showing the step of applying vibration energy to the plurality of multilayer bodies and media 20 in the step of applying vibration to the agitation vessel shown in FIG. 10. As shown in FIG. 11, by rotating eccentric load 170 in surface treatment apparatus 100, positions of the centers of gravity of drive motor 160 and vibration reception plate 140 are displaced from each other. Thus, vibration reception plate 140 is inclined and extension and contraction of the plurality of elastic members 180 becomes uneven. As vibration reception plate 140 is inclined, a central axis C of bottom portion 151 of agitation vessel 150 is also inclined.

As a position of eccentric load 170 is continuously varied with rotation, inclination of vibration reception plate 140 is varied in accordance with a position of eccentric load 170. Consequently, a position where unevenness in extension and contraction of elastic member 180 is significant also moves in the circumferential direction. As the plurality of elastic members 180 thus extend and contract, vibration propagates from the plurality of elastic members 180 to agitation vessel 150 such that a direction of inclination of central axis C of bottom portion 151 is continuously varied.

With continuous variation also in the direction of inclination of central axis C of bottom portion 151, when an annular virtual axis VL circumferentially surrounding central axis C of bottom portion 151 before agitation vessel 150 vibrates is assumed, vibration is applied to multilayer bodies 12 and media 20 such that multilayer bodies 12 and media 20 follow a helical trace which helically surrounds virtual axis VL along an axial direction of virtual axis VL.

As vibration of agitation vessel 150 is transmitted to the plurality of multilayer bodies and media 20 introduced into agitation vessel 150, the plurality of multilayer bodies and media 20 are agitated while they are helically tumbled. Media 20 thus roll the surface layer of the baked electrode layer while they collide against the baked electrode layer to thus reduce glass contained in the surface layer of the baked electrode layer. Consequently, a state of the surface layer of the baked electrode layer is reformed and second region 15a2 described above which is high in density of a metal and has a smooth surface is formed.

Agitation vessel 150 itself does not rotate around central axis C although the direction of inclination of agitation vessel 150 is varied in the circumferential direction. Therefore, even when a multilayer body comes in contact with agitation vessel 150, excessive force will not be applied from agitation vessel 150 to the multilayer body. Therefore, fracture and chipping of the multilayer body are able to be significantly reduced or prevented.

In agitation vessel 150, as a distance from shaft portion 155 is greater in the radial direction, more vibration is transmitted to the multilayer bodies and media 20 introduced in agitation vessel 150. Since bottom portion 151 is inclined and shaft portion 155 is also inclined, vibration is more likely to be received from proximate elastic member 180 as shaft portion 155 is more proximate to any of the plurality of elastic members 180.

Therefore, by providing a structure that ensures that the plurality of multilayer bodies and media 20 stay at a position radially distant from shaft portion 155 in agitation vessel 150, vibration is able to effectively be transmitted to the plurality of multilayer bodies and media 20. Surface treatment of the baked electrode layer is thus more efficient.

Agitation vessel 150 is preferably caused to vibrate such that a frequency of agitation vessel 150 resonates with a natural frequency of agitation vessel 150. The natural frequency refers to a frequency at which vibration intensity is higher, that is, energy of working is higher. Surface treatment of the baked electrode layer is able to be efficient by causing agitation vessel 150 to vibrate such that a frequency of agitation vessel 150 is set to the natural frequency.

A frequency of agitation vessel 150 is able to be adjusted, for example, by changing a speed of rotation of eccentric load 170 by drive motor 160. For such adjustment, sensor 200 senses a state of vibration of agitation vessel 150.

When sensor 200 senses deviation of the frequency of agitation vessel 150 from the natural frequency, drive motor controller 210 controls an operation of drive motor 160 such that a frequency of agitation vessel 150 is close to the natural frequency of agitation vessel 150.

With reference again to FIG. 5, in a step S13, multilayer body 12 with the baked electrode layer having second region 15a2 formed thereon is plated. Ni plating and Sn plating are successively provided on the baked electrode layer so that plating layer 15b and plating layer 16b as well as plating layer 15c and plating layer 16c are formed. First external electrode 15 and second external electrode 16 are thus formed on the outer surface of multilayer body 12.

Multilayer ceramic capacitor 10 can be manufactured through the series of steps described above.

As set forth above, the method of manufacturing a multilayer ceramic capacitor according to the first preferred embodiment includes introducing a plurality of multilayer bodies and media 20 into a container, each of the plurality of multilayer bodies including first end surface 12e and second end surface 12f opposed to each other, first side surface 12c and second side surface 12d opposed to each other, and first main surface 12a and second main surface 12b opposed to each other, first end surface 12e being provided with first baked electrode layer 15a, and second end surface 12f being provided with second baked electrode layer 16a, and applying vibration energy to the plurality of multilayer bodies 12 and media 20 by causing agitation vessel 150 to vibrate.

In applying vibration to the plurality of multilayer bodies 12 and media 20, vibration is applied to multilayer bodies 12 and media 20 such that multilayer bodies 12 and media 20 follow a helical trace which helically surrounds virtual axis VL along the axial direction of virtual axis VL described above by causing agitation vessel 150 to vibrate. Thus, in the present preferred embodiment, agitation vessel 150 does not rotate around central axis C of the bottom portion as compared with sandblasting in which a barrel is rotated around an axis while abrasive powders are blown toward multilayer bodies. Therefore, even when the plurality of multilayer bodies 12 come in contact with agitation vessel 150, application of excessive force from agitation vessel 150 to the multilayer bodies is able to be significantly reduced or prevented. Consequently, fracture and chipping of a multilayer body are able to be significantly reduced or prevented.

By applying vibration energy to the plurality of multilayer bodies 12 and media 20, the surface layer of the baked electrode layer is polished while media 20 are rubbed against the surface layer of first baked electrode layer 15*a* and second baked electrode layer 16*a* by agitating the multilayer bodies each provided with first baked electrode layer 15*a* and second baked electrode layer 16*a* and media 20.

Thus, glass contained in the surface layer of first baked electrode layer 15*a* and second baked electrode layer 16*a* is reduced, a metal contained in first baked electrode layer 15*a* and second baked electrode layer 16*a* is rolled, and the surface layer of first baked electrode layer 15*a* and second baked electrode layer 16*a* is planarized. Consequently, the surfaces of first baked electrode layer 15*a* and second baked electrode layer 16*a* are smoothened, density of a metal on the side of the surface layer of first baked electrode layer 15*a* and second baked electrode layer 16*a* can be high, and the surfaces of first baked electrode layer 15*a* and second baked electrode layer 16*a* are able to be reformed.

By using tungsten which is spherical in shape and higher in specific gravity than zirconium as medium 20, a mass and kinetic energy of medium 20 is able to be increased as described above. A time period (process time period) required for surface treatment of first baked electrode layer 15*a* and second baked electrode layer 16*a* is thus able to be reduced.

By setting a diameter of medium 20 to be not smaller than about 0.2 mm and not greater than about 2.0 mm, medium 20 is able to collide against a multilayer body with suitable kinetic energy and a metal exposed at the surface layer of first baked electrode layer 15*a* and the surface layer of second baked electrode layer 16*a* is able to be sufficiently be rolled without damaging multilayer body 12. Consequently, the surface of the baked electrode layer provided in an electronic component body (multilayer body) is able to be reformed.

Second Preferred Embodiment

Figure 12:
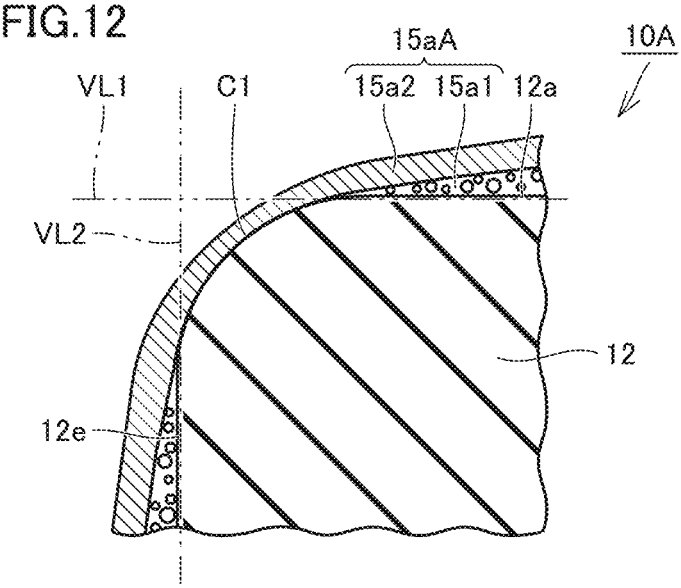
FIG. 12 is a partial cross-sectional view showing details of a baked electrode layer of a multilayer ceramic capacitor manufactured in accordance with a method of manufacturing a multilayer ceramic capacitor according to a second preferred embodiment of the present invention.

FIG. 12 is a partial cross-sectional view showing details of a baked electrode layer of a multilayer ceramic capacitor manufactured in accordance with a method of manufacturing a multilayer ceramic capacitor according to a second preferred embodiment of the present invention. A multilayer ceramic capacitor 10A manufactured in accordance with the method of manufacturing a multilayer ceramic capacitor according to the second preferred embodiment will be described with reference to FIG. 12.

As shown in FIG. 12, multilayer ceramic capacitor 10A according to the second preferred embodiment is different from multilayer ceramic capacitor 10 according to the first preferred embodiment in the structure of a first baked electrode layer 15*a*A and a second baked electrode layer (not shown). The construction is otherwise substantially the same. Since the second baked electrode layer is similar in construction to first baked electrode layer 15*a*A, description thereof will not be provided.

First baked electrode layer 15*a*A is constructed such that second region 15*a*2 is in contact with a corner portion of multilayer body 12. By way of example, only second region 15*a*2 of first baked electrode layer 15*a*A is provided on a corner portion C1 which connects first main surface 12*a* of multilayer body 12 and first end surface 12*e* of multilayer body 12 to each other. Corner portion C1 refers to a curved portion located on an inner side of a first virtual line VL1 which passes through a ridgeline portion where first main surface 12*a* and first side surface 12*c* intersect with each other and a second virtual line VL2 which passes through a ridgeline portion where first end surface 12*e* and first side surface 12*c* intersect with each other when viewed in the direction of width W.

On a side of first end surface 12*e* on first main surface 12*a* of multilayer body 12, first region 15*a*1 and second region 15*a*2 of first baked electrode layer 15*a*A are successively provided from the side of multilayer body 12. Though not shown in FIG. 12, similarly, on the side of first end surface 12*e* on second main surface 12*b* of multilayer body 12, first region 15*a*1 and second region 15*a*2 of first baked electrode layer 15*a*A are successively provided from the side of multilayer body 12. On first end surface 12*e* of multilayer body 12, first region 15*a*1 and second region 15*a*2 of first baked electrode layer 15*a*A are provided from the side of multilayer body 12.

First baked electrode layer 15*a*A is formed preferably by applying a conductive paste containing glass and a metal to first end surface 12*e* by immersion and baking the conductive paste after it is dried. In application of the conductive paste to first end surface 12*e*, it tends to be small in thickness in a corner portion.

Therefore, the baked electrode layer formed when the conductive paste applied to first end surface 12*e* is baked is also small in thickness in the corner portion. When the baked electrode layer formed in the corner portion is small in thickness to a considerable extent, it is rolled by medium 20 in surface treatment thereof so that only second region 15*a*2 which is high in density of the metal and has a smooth surface is formed.

A baked electrode layer located in a portion other than the corner portion is greater in thickness than the baked electrode layer located in the corner portion. Therefore, in surface treatment of the baked electrode layer, second region 15*a*2 which is high in density of the metal and has a smooth surface is provided only on the side of the surface layer and first region 15*a*1 where pores and glass remain is provided on the side of multilayer body 12.

In particular, when a small multilayer body of which length dimension is not greater than about 1.6 mm, width dimension is not greater than about 0.8 mm, and thickness dimension is not greater than about 0.8 mm is handled, a metal in the baked electrode layer in the corner portion tends to be rolled in surface treatment as described above and the construction of multilayer ceramic capacitor 10A as in the second preferred embodiment tends to be obtained.

According to the construction as above, second region 15*a*2 high in density of the metal is provided on the side of the surface layer of the first baked electrode layer and the second baked electrode layer so that moisture resistance of multilayer body 12 is able to be improved.

As the surface of second region 15*a*2 is constructed to be smooth, a defect in plating layer 15*b* and plating layer 15*c* are able to be significantly reduced or prevented in formation of plating layer 15b and plating layer 15c. Continuity between plating layer 15b and plating layer 15c is able to be improved.

As first region 15a1 contains pores, first baked electrode layer 15aA has cushioning properties in a portion other than the corner portion and external impacts applied to multilayer ceramic capacitor 10A are able to be absorbed.

A method of manufacturing multilayer ceramic capacitor 10A according to the second preferred embodiment is similar to the method of manufacturing multilayer ceramic capacitor 10 according to the first preferred embodiment.

In manufacturing multilayer ceramic capacitor 10A in accordance with the method of manufacturing multilayer ceramic capacitor 10A according to the second preferred embodiment, processing substantially the same as in steps S1 to S8 according to the first preferred embodiment is performed.

Then, in a step in conformity with step S9 according to the first preferred embodiment, a conductive paste is applied to a side of first end surface 12e and a side of second end surface 12f such that a thickness of the conductive paste in a corner portion of multilayer body 12 is smaller than a thickness of the conductive paste applied to a portion of first main surface 12a and second main surface 12b, a part of first side surface 12c and second side surface 12d, and first end surface 12e and second end surface 12f.

A plurality of multilayer bodies each provided with the first baked electrode layer and the second baked electrode layer constructed such that a portion thereof corresponding to a corner portion of multilayer body 12 is smaller in thickness than other portions are formed (prepared) by performing processing substantially the same as in steps S10 and S11 according to the first preferred embodiment.

Then, in a step in conformity with step S12 according to the first preferred embodiment, the plurality of multilayer bodies and media 20 are introduced into agitation vessel 150. Vibration energy is applied to the plurality of multilayer bodies 12 and media 20 by causing agitation vessel 150 to vibrate. In applying vibration energy to the plurality of multilayer bodies 12 and media 20, second region 15a2 which is high in density of a metal and has a smooth surface and first region 15a1 containing glass and pores are formed in the baked electrode layer. In a portion of the baked electrode layer corresponding to the corner portion of multilayer body 12, second region 15a2 is formed so as to contact with the corner portion of multilayer body 12, and in portions other than that, first region 15a1 is provided on the side of multilayer body 12 and second region 15a2 is formed to cover first region 15a1.

Processing substantially the same as in step S13 according to the first preferred embodiment is then performed. Through the steps as above, multilayer ceramic capacitor 10A according to the second preferred embodiment is manufactured.

As set forth above, the method of manufacturing multilayer ceramic capacitor 10A according to the second preferred embodiment also achieves an effect substantially the same as in the method of manufacturing multilayer ceramic capacitor 10 according to the first preferred embodiment.

Third Preferred Embodiment

Figure 13:
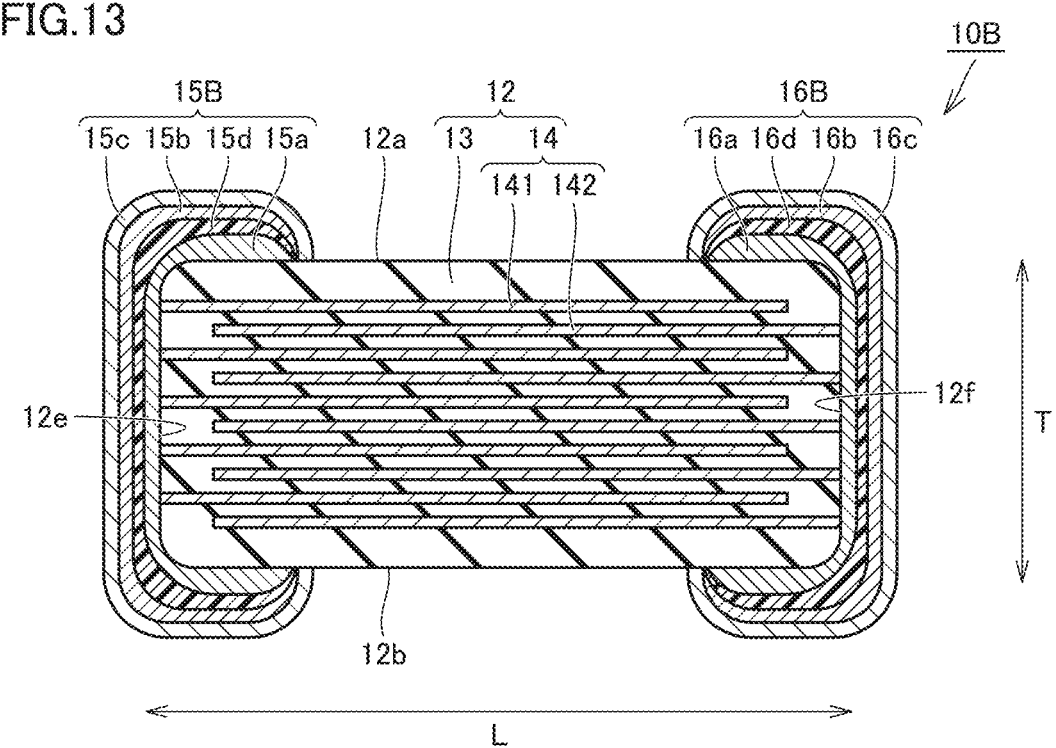
FIG. 13 is a cross-sectional view of a multilayer ceramic capacitor manufactured in accordance with a method of manufacturing a multilayer ceramic capacitor according to a third preferred embodiment of the present invention.

FIG. 13 is a cross-sectional view of a multilayer ceramic capacitor manufactured in accordance with a method of manufacturing a multilayer ceramic capacitor according to a third preferred embodiment of the present invention. A multilayer ceramic capacitor 10B manufactured with the method of manufacturing a multilayer ceramic capacitor according to the third preferred embodiment will be described with reference to FIG. 13.

As shown in FIG. 13, multilayer ceramic capacitor 10B according to the third preferred embodiment is different from multilayer ceramic capacitor 10 according to the first preferred embodiment in construction of a first external electrode 15B and a second external electrode 16B. The construction is otherwise substantially the same.

A first external electrode 15B includes first baked electrode layer 15a, a resin layer 15d, and plating layer 15b and plating layer 15c sequentially from the side of multilayer body 12. First baked electrode layer 15a and resin layer 15d define and function as an underlying electrode. Resin layer 15d is provided between first baked electrode layer 15a and plating layer 15b.

A second external electrode 16B includes second baked electrode layer 16a, a resin layer 16d, and plating layer 16b and plating layer 16c sequentially from the side of multilayer body 12. Second baked electrode layer 16a and resin layer 16d function as an underlying electrode. Resin layer 16d is provided between second baked electrode layer 16a and plating layer 16b.

Resin layer 15d and resin layer 16d contain conductive particles and a thermosetting resin. Particles of a metal such as Cu or Ag can be used as conductive particles. For example, a phenol resin, an acrylic resin, a silicone resin, an epoxy resin, and a polyimide resin can be used as a thermosetting resin.

Resin layer 15d and resin layer 16d may include a plurality of stacked layers. Resin layer 15d and resin layer 16d have a thickness preferably not smaller than about 10 µm and not greater than about 90 µm, for example.

Resin layer 15d and resin layer 16d have continuity not lower than about 80% and not higher than about 90% on a corner portion of multilayer body 12, for example. This continuity can be confirmed in observation with an SEM after multilayer ceramic capacitor 10B is polished. In polishing, for example, multilayer ceramic capacitor 10B is polished to a position in the center in the direction of width W so as to expose a cross-section perpendicular or substantially perpendicular to direction of width W.

According to the construction as above, second region 15a2 high in density of a metal is provided on the side of the surface layer in the first baked electrode layer and the second baked electrode layer so that moisture resistance of multilayer body 12 is improved.

As first region 15a1 contains pores, first baked electrode layer 15a has cushioning properties in a portion other than the corner portion and external impacts applied to multilayer ceramic capacitor 10B are able to be absorbed.

As the surface of second region 15a2 is constructed to be smooth, delamination tends to occur in a boundary portion between first baked electrode layer 15a and resin layer 15d and a boundary portion between second baked electrode layer 16a and resin layer 16d on a side of an end portion of a fold-back portion of first external electrode 15B and second external electrode 16B.

As a mount substrate is warped when multilayer ceramic capacitor 10 is mounted on a mount substrate, an external force may be applied to multilayer ceramic capacitor 10B. Such external force tends to be concentrated on the side of the end portion of the fold-back portion of first external electrode 15B and second external electrode 16B. When an external force is concentrated to the end portion of the fold-back portion, delamination occurs in the boundary portion between first baked electrode layer 15a and resin layer 15d and the boundary portion between second baked electrode layer 16a and resin layer 16d so that stress applied to multilayer body 12 is relaxed. Consequently, multilayer body 12 is prevented from breaking.

Figure 14:
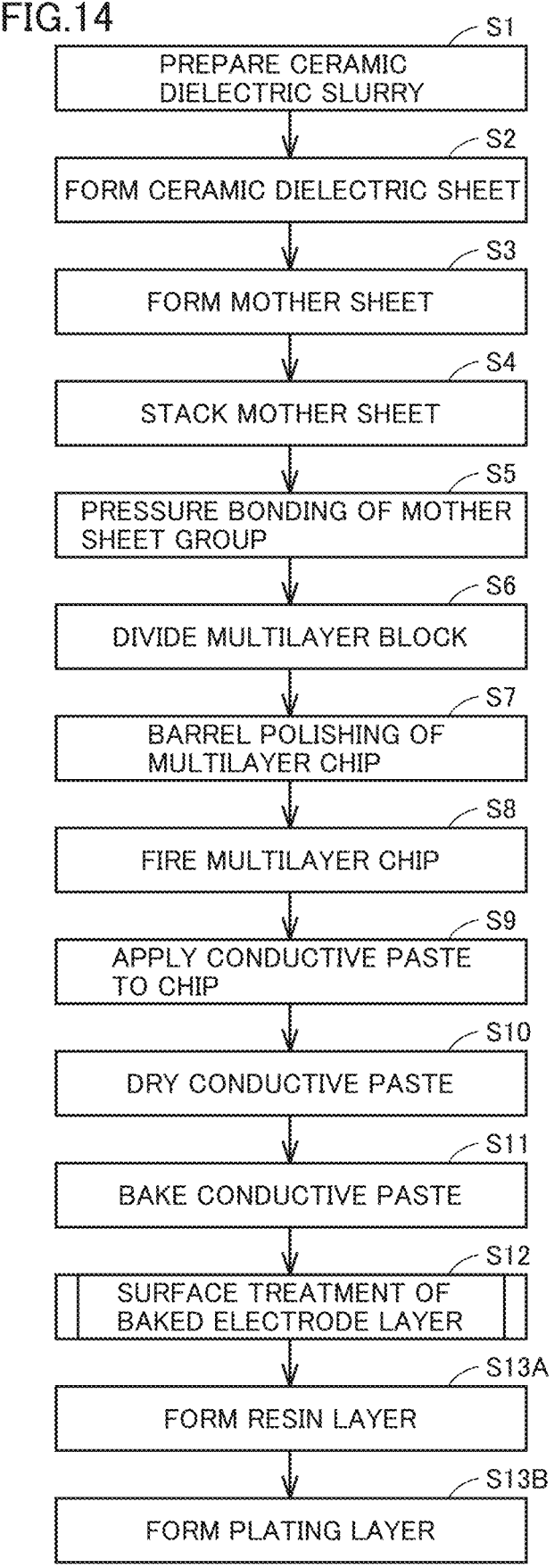
FIG. 14 is a flowchart showing the method of manufacturing a multilayer ceramic capacitor according to the third preferred embodiment of the present invention.

FIG. 14 is a flowchart showing a method of manufacturing a multilayer ceramic capacitor according to the third preferred embodiment. The method of manufacturing a multilayer ceramic capacitor according to the third preferred embodiment will be described with reference to FIG. 14.

As shown in FIG. 14, in manufacturing multilayer ceramic capacitor 10B according to the method of manufacturing multilayer ceramic capacitor 10B according to the third preferred embodiment, processing substantially the same as in the first preferred embodiment is performed in steps S1 to S12.

In a step S13A, a thermosetting resin containing conductive particles is applied onto first baked electrode layer 15a and second baked electrode layer 16a and cured by being heated. Conductive resin layers 15d and 16d are thus formed.

In a step S13B, processing substantially the same as in step S13 according to the first preferred embodiment is performed to form plating layer 15b and plating layer 15c on resin layer 15d and to form plating layer 16b and plating layer 16c on resin layer 16d.

Through the steps as above, multilayer ceramic capacitor 10B according to the third preferred embodiment can be manufactured.

As set forth above, the method of manufacturing multilayer ceramic capacitor 10B according to the third preferred embodiment also achieves an effect substantially the same as in the method of manufacturing multilayer ceramic capacitor 10 according to the first preferred embodiment.

First Verification Experiment

FIG. 15 is a diagram showing a condition and a result in a first verification experiment conducted for verifying advantageous effects of the preferred embodiments of the present invention. The first verification experiment conducted in order to verify the effect of the preferred embodiments will be described with reference to FIG. 15.

As shown in FIG. 15, in conducting the first verification experiment, a plurality of multilayer bodies 12 according to Examples 1 and 2 and Comparative Examples 1 to 7 each provided with first baked electrode layer 15a on the side of first end surface 12e and provided with second baked electrode layer 16a on the side of second end surface 12f of multilayer body 12 were prepared. In a stage of preparation, first baked electrode layer 15a and second baked electrode layer 16a have not yet been subjected to surface treatment.

Each multilayer body 12 had a length dimension of 1.0 mm, a width dimension of 0.5 mm, and a height dimension of 0.5 mm.

In Examples 1 and 2 and Comparative Examples 1 to 7, a medium which was spherical and composed of tungsten was used as medium 20 to be used in the surface treatment. Medium 20 had a diameter of 0.5 mm.

The prepared multilayer bodies according to Examples 1 and 2 and Comparative Examples 1 to 7 were subjected to surface treatment of the baked electrode layer with surface treatment apparatus 100 described above and whether or not a crack was generated and whether or not the surface of the baked electrode layer was reformed was checked.

In Comparative Example 1, a total of volumes of the plurality of multilayer bodies introduced into agitation vessel 150 was set to ½ of the total of volumes of media 20 introduced into agitation vessel 150. A process time period was set to seven hours and a frequency of agitation vessel 150 was set to 15 Hz lower than the natural frequency of agitation vessel 150.

In this case, though no crack was generated in the multilayer bodies after surface treatment, a state of the surface was not improved. Second region 15a2 could not sufficiently be formed.

In Comparative Example 2, a total of volumes of the plurality of multilayer bodies introduced into agitation vessel 150 was set to ½ of the total of volumes of media 20 introduced into agitation vessel 150. A process time period was set to seven hours and a frequency of agitation vessel 150 was set to 35 Hz higher than the natural frequency of agitation vessel 150.

In this case, though no crack was generated in the multilayer bodies after surface treatment, a state of the surface was not improved. Second region 15a2 could not sufficiently be formed.

In Comparative Example 3, a total of volumes of the plurality of multilayer bodies introduced into agitation vessel 150 was set to 6/10 of the total of volumes of media 20 introduced into agitation vessel 150. A process time period was set to three hours and a frequency of agitation vessel 150 was set to 23 Hz as high as the natural frequency of agitation vessel 150.

In this case, after surface treatment, a crack was generated in four of 100 multilayer bodies. A state of the surface was not improved and second region 15a2 could not sufficiently be formed.

In Comparative Example 4, a total of volumes of the plurality of multilayer bodies introduced into agitation vessel 150 was set to 6/10 of the total of volumes of media 20 introduced into agitation vessel 150. A process time period was set to five hours and a frequency of agitation vessel 150 was set to 23 Hz as high as the natural frequency of agitation vessel 150.

In this case, after surface treatment, a crack was generated in six of 100 multilayer bodies. A state of the surface was not improved and second region 15a2 could not sufficiently be formed.

In Comparative Example 5, a total of volumes of the plurality of multilayer bodies introduced into agitation vessel 150 was set to 8/10 of the total of volumes of media 20 introduced into agitation vessel 150. A process time period was set to five hours and a frequency of agitation vessel 150 was set to 23 Hz as high as the natural frequency of agitation vessel 150.

In this case, after surface treatment, a crack was generated in 35 of 100 multilayer bodies. A state of the surface was not improved and second region 15a2 could not sufficiently be formed.

In Comparative Example 6, a total of volumes of the plurality of multilayer bodies introduced into agitation vessel 150 was set to be equal to the total of volumes of media 20 introduced into agitation vessel 150. A process time period was set to five hours and a frequency of agitation vessel 150 was set to 23 Hz as high as the natural frequency of agitation vessel 150.

In this case, after surface treatment, a crack was generated in 41 of 100 multilayer bodies. A state of the surface was not improved and second region 15a2 could not sufficiently be formed.

In Comparative Example 7, a total of volumes of the plurality of multilayer bodies introduced into agitation vessel 150 was set to be equal to the total of volumes of media 20 introduced into agitation vessel 150. A process time period was set to seven hours and a frequency of agitation vessel 150 was set to 23 Hz as high as the natural frequency of agitation vessel 150.

In this case, after surface treatment, a crack was generated in 58 of 100 multilayer bodies. A state of the surface was not improved and second region 15a2 could not sufficiently be formed.

In Example 2, a total of volumes of the plurality of multilayer bodies introduced into agitation vessel 150 was set to at most ⅓ (3/10) of the total of volumes of media 20 introduced into agitation vessel 150. A process time period was set to five hours and a frequency of agitation vessel 150 was set to 23 Hz as high as the natural frequency of agitation vessel 150.

In this case, after surface treatment, no crack was generated in the multilayer bodies and a state of the surface was improved. Second region 15a2 could sufficiently be formed in the surface layer of the baked electrode layer.

In Example 1, a total of volumes of the plurality of multilayer bodies introduced into agitation vessel 150 was set to ½ of the total of volumes of media 20 introduced into agitation vessel 150. A process time period was set to five hours and a frequency of agitation vessel 150 was set to 23 Hz as high as the natural frequency of agitation vessel 150.

In this case, after surface treatment, no crack was generated in the multilayer bodies and a state of the surface was improved. Second region 15a2 could sufficiently be formed in the surface layer of the baked electrode layer.

As set forth above, it can be concluded as shown in the results in Examples 1 and 2 that the surface of the baked electrode layer provided in the multilayer body can be reformed while fracture and chipping of the multilayer body is suppressed by using the method of manufacturing a multilayer ceramic capacitor according to the present preferred embodiment. The surface of the baked electrode layer provided in the multilayer body is able to be reformed while fracture and chipping of the multilayer body is significantly reduced or prevented.

It was confirmed that workability by media 20 could be good and generation of a crack in a corner portion of multilayer body 12 or chipping or fracture of multilayer body 12 could be prevented by setting a total of volumes of the plurality of multilayer bodies 12 introduced into agitation vessel 150 to at most ½ of the total of volumes of media 20 introduced into agitation vessel 150 in surface treatment. Furthermore, it was confirmed that a good state of the surface was obtained by setting a total of volumes of the plurality of multilayer bodies 12 introduced into agitation vessel 150 to at most ⅓ of the total of volumes of media 20 introduced into agitation vessel 150.

Based on comparison between Examples 1 and 2 and Comparative Examples 1 and 2, by setting a frequency of agitation vessel 150 to a natural frequency of agitation vessel 150, generation of a crack in a corner portion of multilayer body 12 or chipping or fracture of multilayer body 12 is prevented and the surface of the baked electrode layer is able to be reformed even though a process time period is shorter. It can thus be concluded that vibration can effectively be transmitted to the plurality of multilayer bodies and media 20 and surface treatment is able to be efficient by setting a frequency of agitation vessel 150 to a natural frequency of agitation vessel 150.

In the first verification experiment, in Example 2, a state of the baked electrode layer before and after surface treatment was observed with a scanning electron microscope. FIGS. 16 to 22 below show results of observation of the side of the first end surface, that is, the side of the first baked electrode layer.

Figure 16:
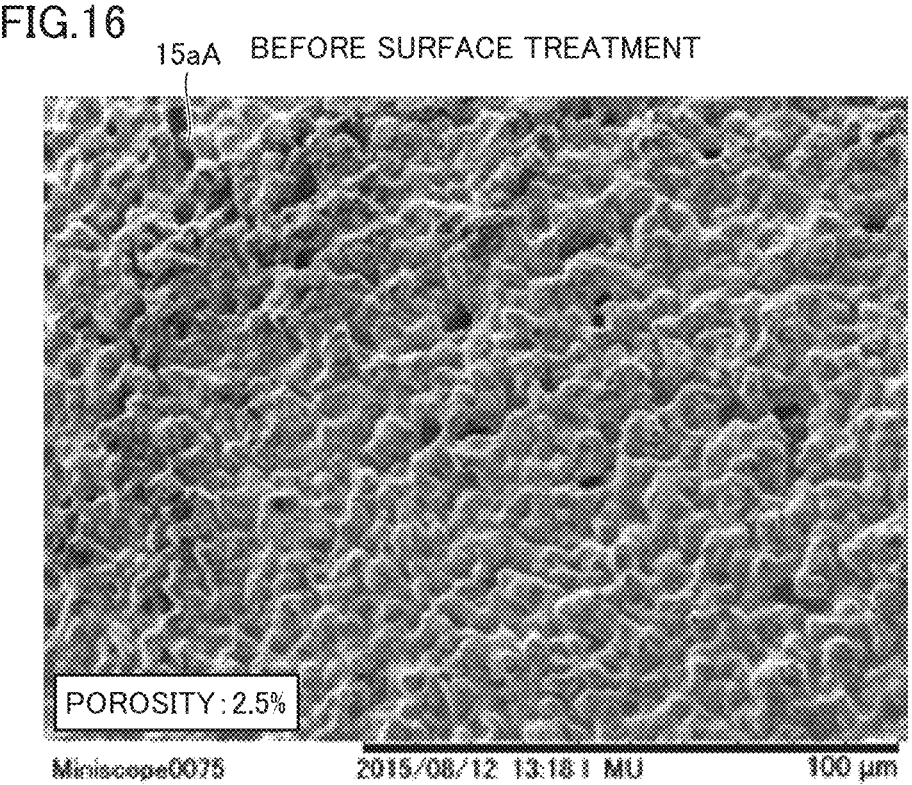
FIG. 16 is a diagram showing a state of a surface of a baked electrode layer before surface treatment in Example 2 shown in FIG. 15.
Figure 17:
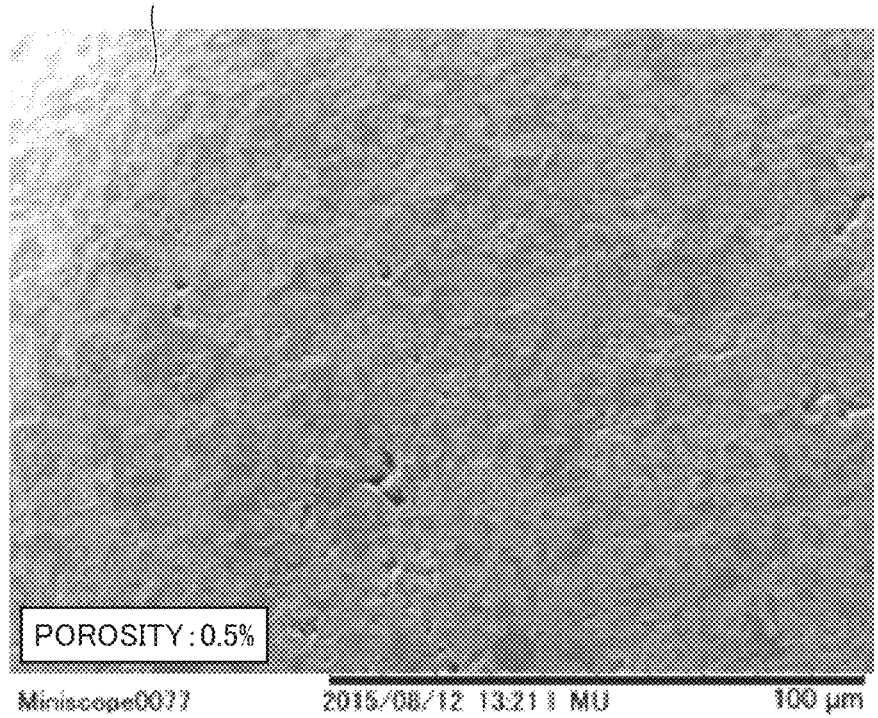
FIG. 17 is a diagram showing a state of the surface of the baked electrode layer after surface treatment in Example 2 shown in FIG. 15.

FIG. 16 is a diagram showing a state of the surface of the baked electrode layer before surface treatment in Example 2 shown in FIG. 15. FIG. 17 is a diagram showing a state of the surface of the baked electrode layer after surface treatment in Example 2 shown in FIG. 15. FIG. 17 shows a state midway through the surface treatment, after lapse of one hour of the process time period. A state of the surface of the baked electrode layer before and after surface treatment will be described with reference to FIGS. 16 and 17.

As shown in FIG. 16, pores to a considerable extent were provided in the surface of the baked electrode layer before surface treatment. A porosity of the surface of the baked electrode layer before surface treatment was approximately 2.5%.

As shown in FIG. 17, substantially no pore was provided in the surface of the baked electrode layer after surface treatment. A porosity of the surface of the baked electrode layer after surface treatment was approximately 0.3%. In a stage midway through surface treatment as well, by performing surface treatment, density of a metal was high in the baked electrode layer and the surface of the baked electrode layer was smoothened. The surface of the baked electrode layer was reformed by surface treatment.

Figure 18:
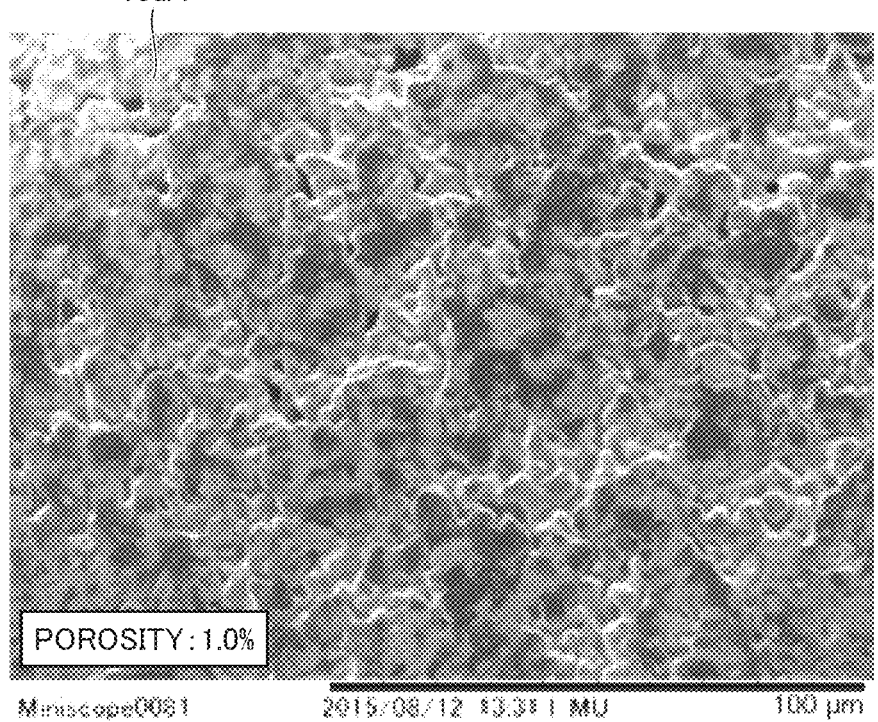
FIG. 18 is a diagram showing as a reference example, a state of a surface of a baked electrode layer after surface treatment with the use of a medium composed of zirconium.

FIG. 18 is a diagram showing a state of the surface of the baked electrode layer after surface treatment with the use of medium 20 composed of zirconia as a reference example. In the reference example, conditions except for medium 20 are the same as in Example 2. FIG. 18 also shows a state midway through surface treatment, after lapse of one hour of the process time period. A state of the surface of the baked electrode layer after surface treatment with the medium composed of zirconia being used as medium 20 will be described with reference to FIG. 18.

As shown in FIG. 18, in the reference example, pores remained although the number thereof is small. A porosity of the surface of the baked electrode layer after surface treatment was approximately 1.0%. In a stage midway through surface treatment as well, by thus performing surface treatment, density of the metal in the baked electrode layer was high and the surface of the baked electrode layer was smoothened. In the reference example as well, the surface of the baked electrode layer was reformed by surface treatment.

It can be seen based on comparison between FIG. 17 in which a medium composed of tungsten was used as medium 20 and FIG. 18 in which a medium composed of zirconia was used as medium 20 that, by using the medium composed of tungsten as medium 20, a rate of reformation of the surface was higher even though the process time period was the same. It could be confirmed that the process time period could be shortened by increasing a mass of medium 20.

Figure 19:
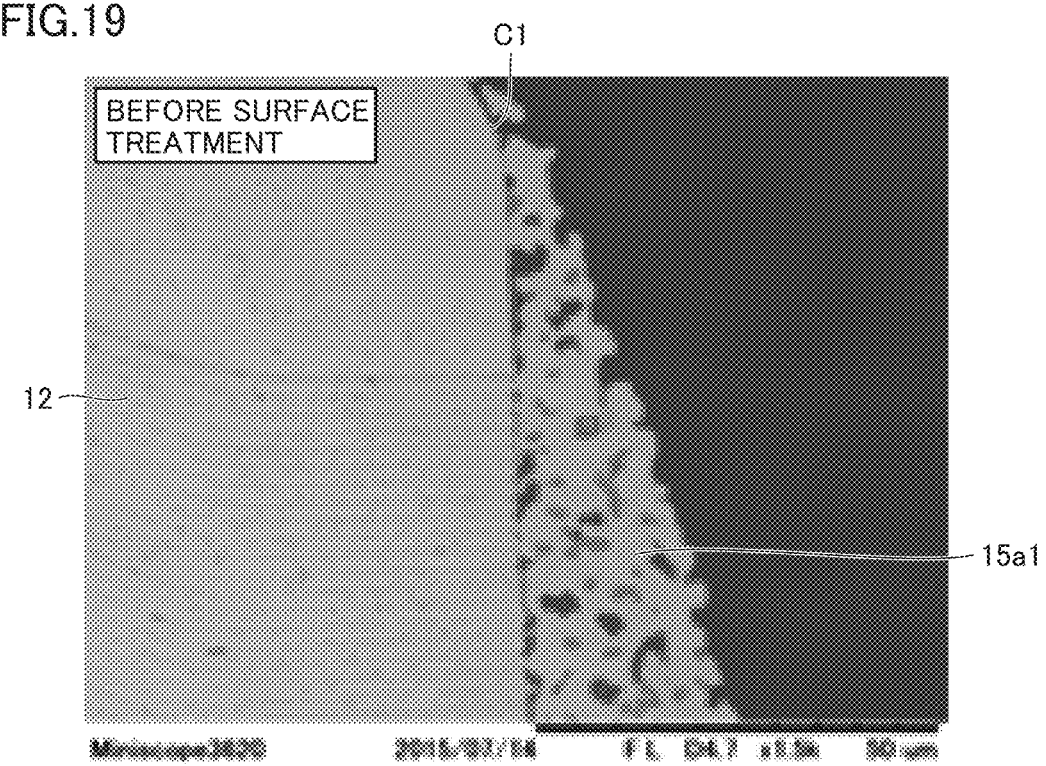
FIG. 19 is a cross-sectional view showing a state of the baked electrode layer in the vicinity of a corner portion before surface treatment in Example 2 shown in FIG. 15.
Figure 20:
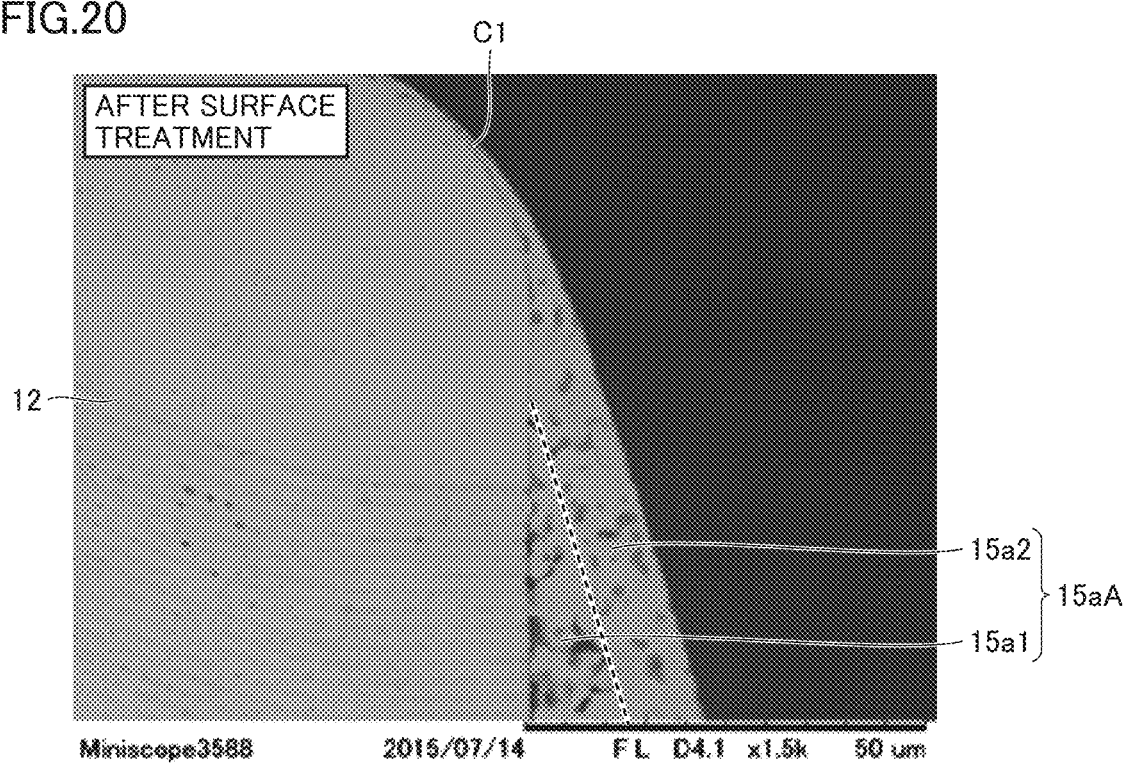
FIG. 20 is a cross-sectional view showing a state of the baked electrode layer in the vicinity of the corner portion after surface treatment in Example 2 shown in FIG. 15.

FIG. 19 is a cross-sectional view showing a state of the baked electrode layer in the vicinity of a corner portion before surface treatment in Example 2 shown in FIG. 15. FIG. 20 is a cross-sectional view showing a state of the baked electrode layer in the vicinity of the corner portion after surface treatment in Example 2 shown in FIG. 15. A state of the baked electrode layer in the vicinity of the corner portion before and after surface treatment will be described with reference to FIGS. 19 and 20.

As shown in FIG. 19, the baked electrode layer in the vicinity of the corner portion before surface treatment contained pores to a considerable extent from the side of multilayer body 12 toward the surface layer of the baked electrode layer and contained glass to a considerable extent.

The baked electrode layer was in a state of first region 15a1 described above throughout the direction of thickness. Therefore, the surface of the baked electrode layer was rough.

As shown in FIG. 20, in the baked electrode layer in the vicinity of the corner portion after surface treatment, density of the metal was high over a range of approximately 10 μm to approximately 15 μm, for example, in the direction of depth from the side of the surface layer of the baked electrode layer and the surface of the baked electrode layer was smoothened. Specifically, after surface treatment, on the corner portion, second region 15a2 described above which was high in density of the metal and had a smooth surface was formed on multilayer body 12. In a portion distant from the corner portion, first region 15a1 was formed on multilayer body 12 and second region 15a2 was formed on first region 15a1.

Figure 21:
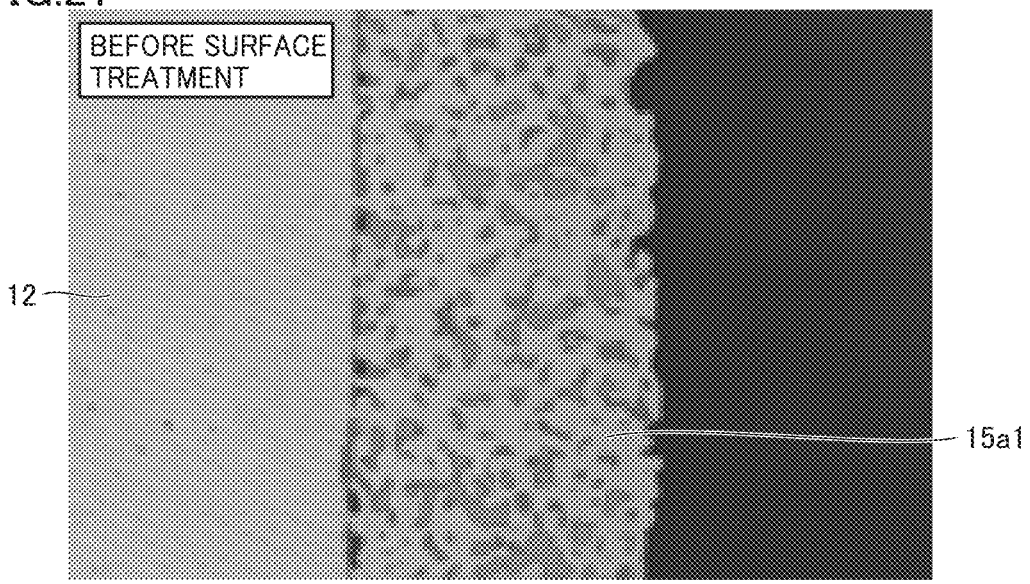
FIG. 21 is a cross-sectional view showing a state of the baked electrode layer in a central portion of an end surface before surface treatment in Example 2 shown in FIG. 15.
Figure 22:
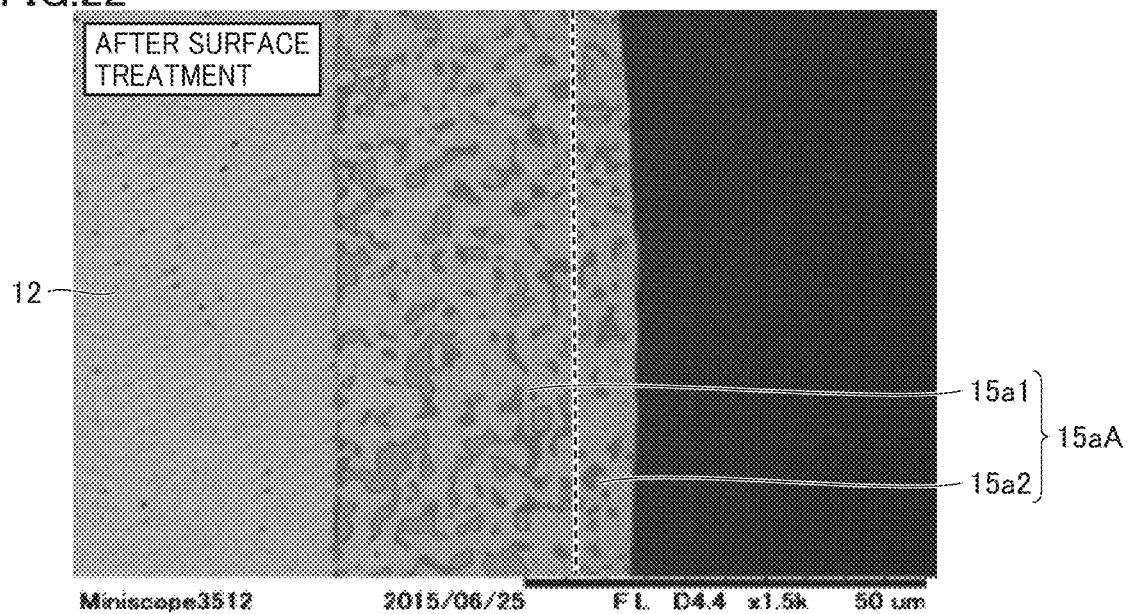
FIG. 22 is a cross-sectional view showing a state of the baked electrode layer in the central portion of the end surface after surface treatment in Example 2 shown in FIG. 15.

FIG. 21 is a cross-sectional view showing a state of the baked electrode layer in a central portion of the end surface before surface treatment in Example 2 shown in FIG. 15. FIG. 22 is a cross-sectional view showing a state of the baked electrode layer in the central portion of the end surface after surface treatment in Example 2 shown in FIG. 15. A state of the baked electrode layer in the central portion of the end surface before and after surface treatment will be described with reference to FIGS. 21 and 22.

As shown in FIG. 21, the baked electrode layer in the central portion of the end surface before surface treatment contained pores to a considerable extent from the side of multilayer body 12 toward the surface layer of the baked electrode layer and contained glass to a considerable extent. The baked electrode layer was in a state of first region 15a1 described above throughout the direction of thickness. Therefore, the surface of the baked electrode layer was rough.

As shown in FIG. 22, in the baked electrode layer in the central portion of the end surface after surface treatment, density of the metal was high over a range of approximately 10 μm to approximately 15 μm, for example, in the direction of depth from the side of the surface layer of the baked electrode layer and the surface of the baked electrode layer was smoothened. Specifically, after surface treatment, in the central portion of the end surface, first region 15a1 was formed on multilayer body 12 and second region 15a2 was formed on first region 15a1.

It could be confirmed in FIGS. 19 to 22 that a state was reformed by surface treatment not only in the surface of the baked electrode layer but also in the direction of depth. It was confirmed that the baked electrode layer was uniformly reformed through the surface treatment since a depth of a portion where the baked electrode layer was reformed in the vicinity of the corner portion and a depth of a portion where the baked electrode layer was reformed in the central portion of the end surface were substantially equal to each other.

Furthermore, in the first verification experiment, twenty four multilayer ceramic capacitors according to Comparative Example 8 and twenty four multilayer ceramic capacitors according to Example 2 were prepared and subjected to a moisture resistance load test. A multilayer ceramic capacitor having a plating layer formed on a baked electrode layer without surface treatment of the baked electrode layer was prepared as the multilayer ceramic capacitor according to Comparative Example 8. A multilayer ceramic capacitor having a plating layer formed on a baked electrode layer subjected to surface treatment under conditions according to Example 2 described above was prepared as the multilayer ceramic capacitor according to Example 2.

The multilayer ceramic capacitors according to Comparative Example 8 and the multilayer ceramic capacitors according to Example 2 were exposed to an environment at 125° C. and a humidity of 95% for forty hours and variation in resistance was determined.

In Comparative Example 8, six of twenty four multilayer ceramic capacitors were deteriorated.

In Example 2, only one multilayer ceramic capacitor of twenty four multilayer ceramic capacitors was deteriorated and moisture resistance was improved as compared with Comparative Example 8.

It was confirmed from the foregoing that entry of water vapor could be suppressed and thus reliability of the multilayer ceramic capacitor could be improved by subjecting the baked electrode layer to surface treatment to thereby form a metal layer (second region) high in density.

Second Verification Experiment

FIG. 23 is a diagram showing a condition and a result of a second verification experiment conducted for verifying advantageous effects of the preferred embodiments of the present invention. The second verification experiment conducted for verifying advantageous effects of the preferred embodiments will be described with reference to FIG. 23. FIG. 23 shows surface roughness Sa (nm) of the baked electrode layer after surface treatment of the baked electrode layer with a diameter and a specific gravity of the medium being set as shown in the figure.

In conducting the second verification experiment, a plurality of multilayer bodies 12 each provided with first baked electrode layer 15a on the side of first end surface 12e and provided with second baked electrode layer 16a on the side of second end surface 12f of multilayer body 12 were prepared. In a stage of preparation, first baked electrode layer 15a and second baked electrode layer 16a have not yet been subjected to surface treatment.

Multilayer body 12 had a length dimension of 1.0 mm, a width dimension of 0.5 mm, and a height dimension of 0.5 mm.

As shown in FIG. 23, media different in specific gravity and diameter from one another were prepared as media 20 used in surface treatment of the plurality of multilayer bodies. Specifically, various media having a diameter of 0.1 mm, 0.2 mm, 0.4 mm, 1.0 mm, 2.0 mm, or 2.5 mm and having a specific gravity of 5 or 18 were prepared. Various media were spherical and composed of tungsten.

The plurality of prepared multilayer bodies were subjected to surface treatment of the baked electrode layer with various media and the surface treatment apparatus described above and surface roughness Sa of the baked electrode layer was measured. Surface roughness Sa was measured in the central portion of the end surface, and an area of measurement was set to the inside of a circle having a diameter of 0.2 mm.

With the medium having a diameter of 0.1 mm, in any case of a specific gravity of 5 and 18, surface roughness Sa of the baked electrode layer after surface treatment was not smaller than 500 nm. With the medium having a diameter of 2.5 mm, in any case of a specific gravity of 5 and 18, surface roughness was not smaller than 180 nm.

In contrast, with the medium having a diameter not smaller than about 0.2 mm and not greater than about 2.0 mm, in any case of a specific gravity of 5 and 18, surface roughness Sa of the baked electrode layer after surface treatment was smaller than 180 nm. In particular, by using a medium having a diameter not smaller than about 0.4 mm and not greater than about 1.0 mm, surface roughness Sa of the baked electrode layer after surface treatment was not greater than 90 nm.

It was confirmed also experimentally from the results above that the surface of the baked electrode layer could be reformed when the medium was spherical, had a diameter not smaller than about 0.2 mm and not greater than about 2.0 mm, and contained tungsten.

It can be concluded that the surface of the baked electrode layer is able to be reformed by setting a specific gravity of the medium to be not lower than 5 and not higher than 18 under the conditions above. It can additionally be concluded that the surface of the baked electrode layer is able to further be reformed by setting a diameter of the medium to be not smaller than about 0.4 mm and not greater than about 1.0 mm, for example.

FIG. 24 is a diagram showing one example of surface roughness of the medium used in the second verification experiment. Surface roughness of the medium used in the second verification experiment is as shown in FIG. 24. Average surface roughness Sa when the number of media to be measured was set to five was 40 nm and a standard deviation σ1 was 25 nm.

When a standard deviation was calculated again with corrected average surface roughness Sa being defined as 46 nm in consideration of variation in measurement, a standard deviation σ2 was approximately 29 nm. A value calculated by adding a value five times as large as standard deviation σ2 to corrected average surface roughness Sa was set as the upper limit of surface roughness Sa of the medium. In this case, the upper limit of surface roughness Sa of the medium is approximately 191 nm. By setting surface roughness Sa of the medium to about 190 nm or smaller, for example, the surface of the baked electrode layer is able to be reformed as above.

The upper limit is a value serving as an index and a value exceeding this value is not necessarily excluded. For example, surface roughness Sa of the medium may be not greater than about 200 nm, for example.

In the first to third preferred embodiments described above, an internal structure of the multilayer ceramic capacitor is not limited to the structure disclosed in the first to third preferred embodiments and can be modified as appropriate.

Though an example in which a resin layer is formed after the baked electrode layer is subjected to surface treatment is exemplified and described in the third preferred embodiment above, limitation thereto is not intended and a resin layer may be formed on the baked electrode layer before surface treatment of the baked electrode layer and the resin layer may be subjected to surface treatment. When the resin layer defines the surface of the underlying electrode layer, the resin layer may be subjected to surface treatment with a medium. In this case as well, the baked electrode layer includes a first region which contains pores and glass to a considerable extent and has cushioning properties so that external impact applied to multilayer ceramic capacitor 10 can be absorbed. Resistance to impact is thus improved.

As a result of surface treatment of the resin layer, the surface of the resin layer is reformed and smoothened. The resin layer is thus able to be satisfactorily be plated and attaching properties of plating in a corner portion are prevented from being deteriorated. Consequently, defective mounting in mounting of multilayer ceramic capacitor 10 on a mount substrate is significantly reduced or prevented.

The baked electrode layer may be subjected to surface treatment and the resin layer may further be subjected to surface treatment. Advantageous effects the same as described above are obtained also in this case.

Although multilayer ceramic capacitors are described above as examples of electronic components according to the first to third preferred embodiments above, limitation thereto is not intended and various electronic components including an external electrode such as a piezoelectric component, a thermistor, or an inductor are able to be adopted as an electronic component.

Features which can be combined may mutually be combined in the description of the preferred embodiments above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing an electronic component comprising:
introducing only a plurality of multilayer bodies and media into a container, the plurality of multilayer bodies each including a first end surface and a second end surface opposed to each other in a direction of length, a first side surface and a second side surface opposed to each other in a direction of width perpendicular or substantially perpendicular to the direction of length, and a first main surface and a second main surface opposed to each other in a direction of height perpendicular or substantially perpendicular to the direction of length and the direction of width, the first end surface being provided with a first baked electrode layer, and the second end surface being provided with a second baked electrode layer; and
applying vibration energy to the plurality of multilayer bodies and the media by applying vibration to the container, the container including a bottom portion and a circumferential wall portion connected to a circumferential edge of the bottom portion; wherein
when an annular virtual axis circumferentially surrounding a central axis of the bottom portion is assumed in a state before vibration of the container, in the applying vibration energy to the plurality of multilayer bodies and the media, vibration is applied to the plurality of multilayer bodies and the media such that only the plurality of multilayer bodies and the media follow a helical trace helically surrounding the virtual axis along an axial direction of the virtual axis; and
a frequency of the vibration applied to the container resonates with a natural frequency of the container.

2. The method of manufacturing an electronic component according to claim 1, wherein each of the first baked electrode layer and the second baked electrode layer includes a material containing any one of Cu, Ag, Ni, Pd, an Ag—Pd alloy, and Au.

3. The method of manufacturing an electronic component according to claim 1, wherein a total of volumes of the plurality of multilayer bodies introduced into the container is at most about ½ of a total of volumes of the media introduced into the container.

4. The method of manufacturing an electronic component according to claim 1, wherein each of the media is spherical or substantially spherical.

5. The method of manufacturing an electronic component according to claim 1, wherein each of the media has a diameter not smaller than about 0.2 mm and not greater than about 2.0 mm.

6. The method of manufacturing an electronic component according to claim 1, wherein each of the media includes tungsten.

7. The method of manufacturing an electronic component according to claim 1, wherein each of the media has a surface roughness Sa not greater than about 190 nm.

8. The method of manufacturing an electronic component according to claim 1, wherein each of the media has a specific gravity not lower than 5 and not higher than 18.

9. The method of manufacturing an electronic component according to claim 1, wherein each of the media has a diameter not smaller than about 0.4 mm and not greater than about 1.0 mm.

10. The method of manufacturing an electronic component according to claim 1, wherein each of the media includes cobalt and/or chromium.

11. The method of manufacturing an electronic component according to claim 1, wherein the electronic component is one of a multilayer ceramic capacitor, a piezoelectric component, a thermistor, and an inductor.

* * * * *